(12) United States Patent
Kawana et al.

(10) Patent No.: US 10,048,496 B2
(45) Date of Patent: Aug. 14, 2018

(54) HEAD UP DISPLAY APPARATUS

(71) Applicant: FUJIFILM Corporation, Tokyo (JP)

(72) Inventors: Masanao Kawana, Saitama (JP); Tomoyuki Baba, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/391,080

(22) Filed: Dec. 27, 2016

(65) Prior Publication Data
US 2017/0212346 A1 Jul. 27, 2017

(30) Foreign Application Priority Data
Jan. 26, 2016 (JP) .................. 2016-012083

(51) Int. Cl.
*G02B 27/14* (2006.01)
*G09G 5/00* (2006.01)
*G02B 27/01* (2006.01)

(52) U.S. Cl.
CPC .... *G02B 27/0101* (2013.01); *G02B 2027/011* (2013.01); *G02B 2027/015* (2013.01); *G02B 2027/0118* (2013.01); *G02B 2027/0141* (2013.01); *H05K 999/99* (2013.01)

(58) Field of Classification Search
CPC ........ G02B 27/0134; G02B 2027/0136; G02B 2027/0141; G02B 2027/0145; G02B 2027/0181; G02B 2027/0183; G02B 27/01; G02B 27/0101; G02B 27/0149; G02B 27/0189; G02B 2027/013; G02B 27/0172
USPC .................................. 359/630, 631
See application file for complete search history.

(56) References Cited

U.S. PATENT DOCUMENTS

2016/0193922 A1* 7/2016 Kuzuhara ............ G03B 21/28
345/7

FOREIGN PATENT DOCUMENTS

JP 2009-115908 A 5/2009

* cited by examiner

*Primary Examiner* — William Choi
(74) *Attorney, Agent, or Firm* — Studebaker & Brackett PC

(57) ABSTRACT

A head up display apparatus includes: a first mirror having power; a second mirror having power; and a light shielding member provided with an aperture. The aperture is provided between an image display surface and the second mirror. Display light which is output from the image display surface is reflected by the first mirror, the second mirror, and the first mirror in this order, and reaches a front windshield (image reflection surface) by passing through the aperture.

9 Claims, 6 Drawing Sheets

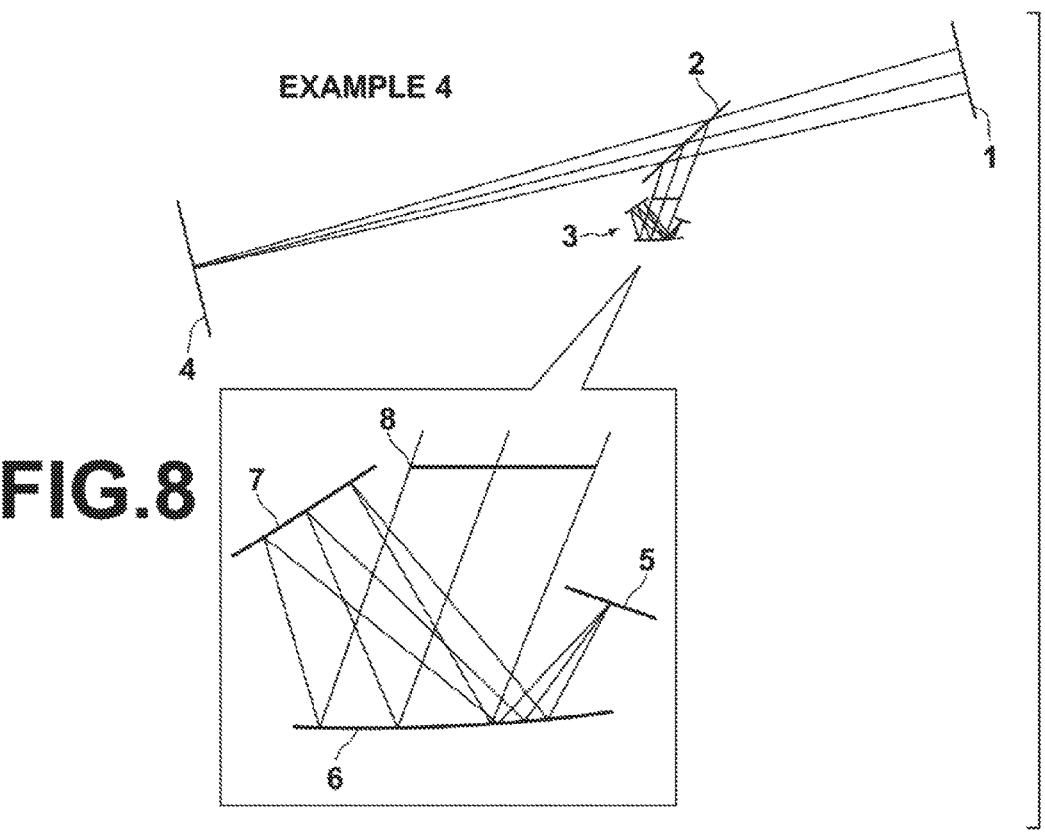
FIG.8 EXAMPLE 4
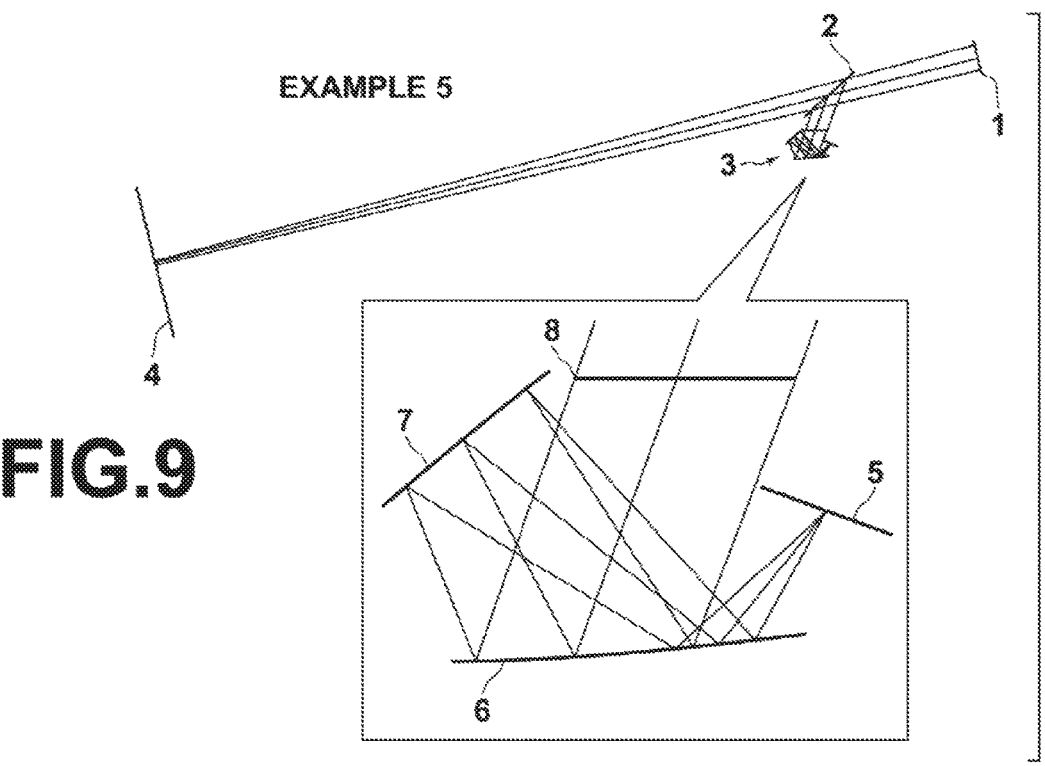
FIG.9 EXAMPLE 5

HEAD UP DISPLAY APPARATUS

CROSS REFERENCE TO RELATED APPLICATIONS

The present application claims priority under 35 U.S.C. § 119 to Japanese Patent Application No. 2016-012083 filed on Jan. 26, 2016. The above application is hereby expressly incorporated by reference, in its entirety, into the present application.

BACKGROUND

The present disclosure is related to a head up display apparatus for use in vehicles such as automobiles.

Conventionally, head up display apparatuses are known as an apparatus that displays directional commands, warnings, traveling speed, etc. to drivers of automobiles and the like. These head up display apparatuses project virtual images of images to be displayed onto image reflection surfaces of windshields or combiners, etc., to enable drivers to discriminate information necessary to drive automobiles or the like, without averting their eyes from fields of view. Japanese Unexamined Patent Publication No. 2009-115908 proposes such a head up display apparatus.

SUMMARY

It is necessary for such a head up display apparatus to be installed in a limited space about the driver's seat of a vehicle such as an automobile. Therefore, it is required for head up display apparatuses to be compact. In addition, virtual images which are displayed by a head up display apparatus are images displayed by image display elements within the head up display apparatus which are magnified and projected onto an image reflection surface. It is necessary to increase the optical path length in order to display the virtual images to be large for the purpose of improving visibility thereof.

The requirements of securing a long optical path and miniaturization of the apparatus conflict each other. In Japanese Unexamined Patent Publication No. 2009-115908, two mirrors, which are a planar mirror and a concave mirror, are combined, and the apparatus is configured such that display light which is output from an image display element reach the planar mirror, the concave mirror, the planar mirror, and an image reflection surface, in this order. That is, the display light is reciprocate between the two mirrors in order to gain optical path length.

However, in the above configuration, only one of the surfaces between the mirror reflection surfaces from the image display element to the image reflection surface has power. As a result, the degree of freedom in correcting aberrations that appear in a virtual image is low, and it is difficult to improve the image quality of the virtual image.

The present disclosure has been developed in view of the foregoing circumstances. The present disclosure provides a head up display apparatus which is capable of securing an optical path length from an image display element to an image reflection surface, achieving miniaturization, and displaying virtual images having high image quality.

A head up display apparatus of the present disclosure magnifies and displays an image to an observer as a virtual image, and comprises:

an image reflection surface that faces the observer and reflects display light which is displayed on an image display surface toward the observer;

a first mirror having power;

a second mirror having power; and a light shielding member provided with an aperture;

the aperture being provided between the image display surface and the second mirror;

the display light which is output from the image display surface being reflected by the first mirror, the second mirror, and the first mirror in this order, and reaching the image reflection surface by passing through the aperture.

Here, the expression "image display surface" refers not only to the image display surface of an image display element, but also includes an image display surface of a diffusing member in the case that an image which is displayed by the image display element is projected through a diffusing member such as a diffuser in order to enlarge the range of pupil positions (hereinafter, referred to as "eye box") of an observer in which a virtual image can be appropriately observed.

In addition, the expression "the aperture being provided between the image display surface and the second mirror" means that the aperture is positioned between the image display surface and the second mirror as viewed from a direction perpendicular to a plane that includes the central positions of each of the image display surface, the first mirror, and the second mirror, which is designated as an arrangement plane. That is, the expression includes cases in which the aperture is not positioned between the image display surface and the second mirror when viewed from a direction parallel to the arrangement plane.

In the head up display apparatus of the present disclosure, it is preferable for a light deflecting means such as a mirror to not be included within the optical path of the display light from the image display surface to the first mirror, and for the image display surface to be provided at a position at which external light that enters through the aperture does not directly impinge thereon. Here, the expression "the optical path of the display light from the image display surface to the first mirror" refers to the optical path of a light beam which is output from the image display surface and enters the first mirror the first time.

In addition, it is preferable for at least a portion of the aperture to be above the upper edge of a reflection surface of the second mirror, when the direction of the optical path of the display light from the image display surface to the first mirror is vertical, the side of the first mirror is the downward direction, and the side of the image reflection surface is the upward direction.

In addition, it is preferable for Conditional Formula (1) below to be satisfied, and more preferable for Conditional Formula (1-1) below to be satisfied.

$$5 < Sm/Si < 30 \tag{1}$$

$$7 < Sm/Si < 27 \tag{1-1}$$

wherein Si is the area of the image display surface capable of displaying an image, and Sm is the surface area of the reflection surface of the second mirror.

In addition, it is preferable for Conditional Formula (2) below to be satisfied, and more preferable for Conditional Formula (2-1) below to be satisfied. Note that FIG. 3 is a diagram for explaining the contents which are represented by the symbol in Conditional Formula (2). FIG. 3 illustrates an image display surface 5, a first mirror 6, a second mirror 7, and an aperture 8. Conditional Formula (2) defines the inclination of a light beam, which is output from the image display surface 5 and enters the first mirror 6 the first time, with respect to the first mirror 6. Note that the light beam of Conditional Formula (2) refers to a light beam which is output from the image display surface 5 and ultimately passes through the aperture 8.

$$20<\alpha<45 \quad (2)$$

$$25<\alpha<40 \quad (2\text{-}1)$$

wherein α is the incident angle (°) of a light ray having the minimal incident angle with respect to a line normal to the reflection surface of the first mirror at a position at which a light beam output from the center (the barycenter, for example) of a region of the image display surface which is capable of displaying images, within the light beam.

In addition, it is preferable for Conditional Formula (3) below to be satisfied, and more preferable for Conditional Formula (3-1) below to be satisfied. Note that FIG. 4 is a diagram for explaining the contents which are represented by the symbols in Conditional Formula (3). FIG. 4 illustrates the image display surface 5, the first mirror 6, the second mirror 7, and the aperture 8. Conditional Formula (3) also defines the inclination of a light beam, which is output from the image display surface 5 and enters the first mirror 6 the first time, with respect to the first mirror. Note that the light beam of Conditional Formula (3) refers to a light beam which is output from the image display surface 5 and ultimately passes through the aperture 8.

$$1.05<L2/L1<1.35 \quad (3)$$

$$1.10<L2/L1<1.31 \quad (3\text{-}1)$$

wherein L1 is the minimum value of the optical length from the image display surface to the first mirror within a light beam which is output from the center of an edge opposite an edge toward the second mirror of the region of the image display surface which is capable of displaying images, and L2 is the minimum value of the optical length from the image display surface to the first mirror within a light beam which is output from the center of the edge toward the second mirror of the region of the image display surface which is capable of displaying images.

The head up display apparatus comprises: the first mirror having power; the second mirror having power; and the light shielding member provided with an aperture; the aperture being provided between the image display surface and the second mirror; the display light which is output from the image display surface being reflected by the first mirror, the second mirror, and the first mirror in this order, and reaching the image reflection surface by passing through the aperture. Therefore, the head up display can secure a long optical path length from an image display element to the image reflection surface while achieving miniaturization, and is capable of displaying virtual images having high image quality.

BRIEF DESCRIPTION OF THE DRAWINGS

FIG. 8 is a schematic diagram that illustrates the configuration of a greater distance optical system of the head up display apparatus of Example 4.

FIG. 9 is a schematic diagram that illustrates the configuration of a greater distance optical system of the head up display apparatus of Example 5.

DETAILED DESCRIPTION OF THE PREFERRED EMBODIMENTS

Figure 1:
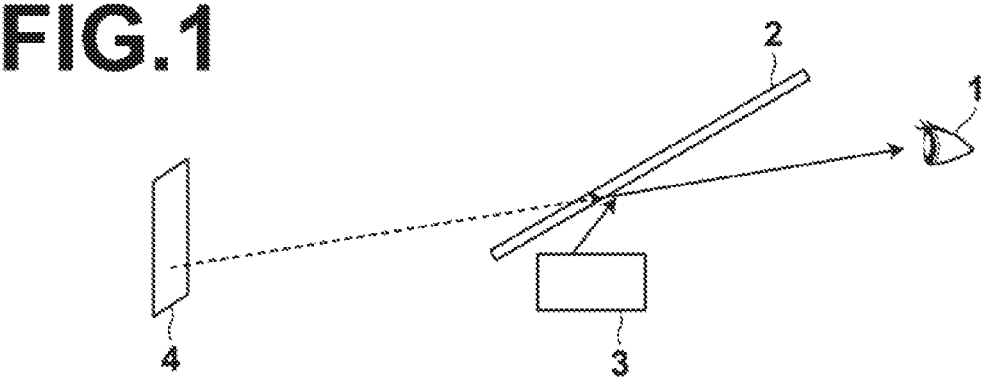
FIG. 1 is a schematic diagram that illustrates the driver's seat of an automobile in which a head up display apparatus according to an embodiment of the present disclosure is mounted.
Figure 2:
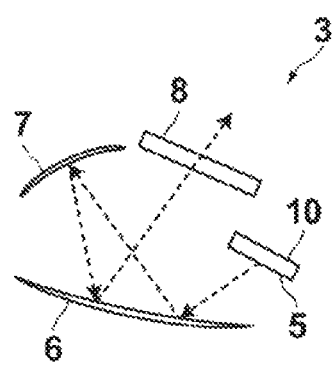
FIG. 2 is a schematic diagram that illustrates the configuration of the head up display apparatus of the embodiment of the present disclosure.
Figure 3:
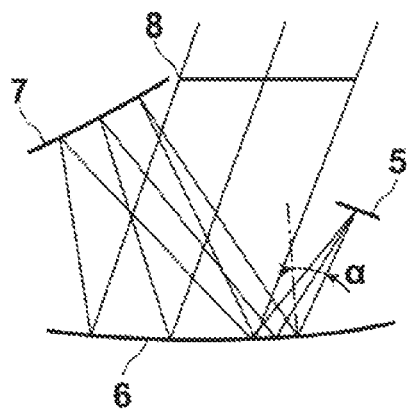
FIG. 3 is a diagram for explaining the contents represented by the symbol in Conditional Formula (2).
Figure 4:
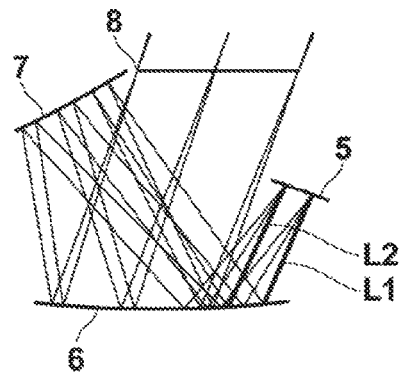
FIG. 4 is a diagram for explaining the contents represented by the symbol in Conditional Formula (3).

Hereinafter, an embodiment of the present disclosure will be described in detail with reference to the attached drawings. FIG. 1 is a schematic diagram that illustrates the driver's seat of an automobile in which a head up display apparatus according to an embodiment of the present disclosure is mounted. FIG. 2 is a schematic diagram that illustrates the configuration of the head up display apparatus.

As illustrated in FIG. 1, the head up display apparatus 3 of the present embodiment is provided within the dashboard of an automobile, causes an image that represents information such as speed of travel which is output from within the apparatus to be reflected by a front windshield (image reflection surface) 2, magnifies and displays the reflected image in front of a driver (observer) 1 through the windshield 2 as a virtual image 4.

As illustrated in FIG. 2, the head up display apparatus 3 includes a first mirror 6 having power, a second mirror 7 having power, and a light shielding member provided with an aperture 8. The aperture 8 is provided between an image display surface 5 of an image display element 10. Display light which is output from the image display surface 5 is reflected by the first mirror 6, the second mirror 7, and the first mirror 6, in this order, and reaches the front windshield (image reflection surface) 2 after passing through the aperture 8. The display light reciprocates between the two mirrors and the optical path thereof intersects itself in order to gain optical path length. In addition, both of the two mirrors have power, to cause the number of reflection surfaces which are capable of correcting aberrations to be three.

Note that the light shielding member is configured as an apparatus casing that covers the entirety of the image display element 1, the first mirror 6, and the second mirror 7. FIG. 2 illustrates only the position of the aperture 8, and the casing (light shielding member) is omitted from the drawing.

Thereby, the head up display is capable of securing an optical path length from the image display surface 5 of the image display element 10 to the front windshield (image reflection surface) 2, achieving miniaturization, and displaying virtual images 4 having high image quality.

Particularly, by configuring the first mirror 6 that reflects the display light twice to have power, an aberration correcting effect and an image enlarging effect corresponding to two mirrors with power can be obtained by one mirror. Therefore, this configuration contributes greatly to miniaturization of the apparatus and improvements in image quality with a low cost burden.

In the head up display apparatus of the present embodiment, it is preferable for a light deflecting means such as a mirror to not be included within the optical path of the display light from the image display surface 5 to the first mirror 6 (the optical path of a light beam which is output from the image display surface 5 and enters the first mirror 6 the first time), and for the image display surface 5 to be provided at a position at which external light that enters through the aperture 8 does not directly impinge thereon. By adopting this configuration, it will not be necessary to secure a space for inserting such a light deflecting means between the image display surface 5 and the first mirror 6, and therefore contributes to miniaturization of the apparatus. In addition, external light will not directly impinge onto the image display surface 5, and therefore the generation of ghosts can be suppressed.

In addition, if the size of the casing is decreased to miniaturize the head up display apparatus, and the position of the aperture 8 becomes excessively close to the first mirror accompanying the decrease in size, the optical path of display light within the apparatus will be cut off by the peripheral portion of the aperture 8, and the range of incident angles of external light with respect to the space within the optical path surrounded by the image display element 10, the first mirror 6, and the second mirror 7 will become wide, which is not preferable. For this reason, it is preferable for at least a portion of the aperture 8 to be above the upper edge of an image reflection surface of the second mirror 7, when the direction of the optical path of the display light between the first mirror 6 and the image reflection surface 2 is vertical, the side of the first mirror 6 is the downward direction, and the side of the image reflection surface 2 is the upward direction.

In addition, it is preferable for Conditional Formula (1) below to be satisfied.

$$5 < Sm/Si < 30 \tag{1}$$

$$7 < Sm/Si < 27 \tag{1-1}$$

wherein Si is the area of the image display surface capable of displaying an image, and Sm is the surface area of the reflection surface of the second mirror.

Here, if the angle of view is designated as A and the power is designated as P, Sm/Si may be expressed as equation (a) below, as a function of A and P.

$$Sm/Si = f(A, P) \tag{a}$$

Here, in the case that the power P is a constant, equation (a) will become equation (b) below.

$$Sm/Si = f(A) \tag{b}$$

At this time, by configuring the head up display apparatus such that the value of Sm/Si is not less than or equal to the lower limit defined in Conditional Formula (1), a sufficient virtual image display size can be secured. By configuring the head up display apparatus such that the value of Sm/Si is not greater than or equal to the upper limit defined in Conditional Formula (1), the size of the second mirror can be prevented from becoming excessively large.

Inversely, in the case that the angle of view A is a constant, equation (a) will become equation (c) below.

$$Sm/Si = f(P) \tag{c}$$

At this time, by configuring the head up display apparatus such that the value of Sm/Si is not less than or equal to the lower limit defined in Conditional Formula (1), the area of the image display surface capable of displaying an image can be decreased with respect to the virtual image display size, which is advantageous from the viewpoint of miniaturization. By configuring the head up display apparatus such that the value of Sm/Si is not greater than or equal to the upper limit defined in Conditional Formula (1), the generation of aberrations can be suppressed, which is advantageous from the viewpoint of improving image quality. Note that more favorable properties can be obtained if Conditional Formula (1-1) is satisfied.

In addition, it is preferable for Conditional Formula (2) below to be satisfied. Conditional Formula (2) defines the inclination of a light beam, which is output from the image display surface 5 and enters the first mirror 6 the first time, with respect to the first mirror 6. Note that the light beam of Conditional Formula (2) refers to a light beam which is output from the image display surface 5 and ultimately passes through the aperture 8. By configuring the head up display apparatus such that the value of a is not less than or equal to the lower limit defined in Conditional Formula (2), the image display element 10 can be prevented from becoming excessively close to the second mirror 7, and the optical path of the display light can be appropriately secured. As a result, such a configuration is advantageous from the viewpoint of maintaining the angle of view (virtual image display size) and the area of the pupil (eye box). By configuring the head up display apparatus such that the value of a is not greater than or equal to the upper limit defined in Conditional Formula (2), the display light can be prevented from entering the first mirror 6 at an excessively great incident angle. As a result, such a configuration is advantageous from the viewpoint of suppressing the generation of aberrations and improving image quality. Note that more favorable properties can be obtained if Conditional Formula (2-1) below is satisfied.

$$20 < \alpha < 45 \tag{2}$$

$$25 < \alpha < 40 \tag{2-1}$$

wherein $\alpha$ is the incident angle(°) of a light ray having the minimal incident angle with respect to a line normal to the reflection surface of the first mirror at a position at which a light beam output from the center (the barycenter, for example) of a region of the image display surface which is capable of displaying images, within the light beam.

In addition, it is preferable for Conditional Formula (3) below to be satisfied. Conditional Formula (3) also defines the inclination of a light beam, which is output from the image display surface 5 and enters the first mirror 6 the first time, with respect to the first mirror. Note that the light beam of Conditional Formula (3) refers to a light beam which is output from the image display surface 5 and ultimately passes through the aperture 8. By configuring the head up display apparatus such that the value of L2/L1 is not less than or equal to the lower limit defined in Conditional Formula (3), the image display element 10 can be prevented from becoming excessively close to the second mirror 7, and the optical path of the display light can be appropriately secured. As a result, such a configuration is advantageous from the viewpoint of maintaining the angle of view (virtual image display size) and the area of the pupil (eye box). By configuring the head up display apparatus such that the value of L2/L1 is not greater than or equal to the upper limit defined in Conditional Formula (3), the display light can be prevented from entering the first mirror 6 at an excessively great incident angle. As a result, such a configuration is advantageous from the viewpoint of suppressing the generation of aberrations and improving image quality. Note that more favorable properties can be obtained if Conditional Formula (3-1) below is satisfied.

$$1.05 < L2/L1 < 1.35 \quad (3)$$

$$1.10 < L2/L1 < 1.31 \quad (3\text{-}1)$$

wherein L1 is the minimum value of the optical length from the image display surface to the first mirror within a light beam which is output from the center of an edge opposite an edge toward the second mirror of the region of the image display surface which is capable of displaying images, and L2 is the minimum value of the optical length from the image display surface to the first mirror within a light beam which is output from the center of the edge toward the second mirror of the region of the image display surface which is capable of displaying images.

Particularly in the case that the configuration of the head up display apparatus is optimized such that Conditional Formula (2) and/or (3) above are satisfied, the image display element 10 will approach the side of the second mirror 7 when the first mirror 6 is viewed from the upward direction of FIG. 2. Therefore, the size of the head up display as a whole can be decreased in the direction in which the image display element 10 and the second mirror 7 are arranged.

Figure 5:
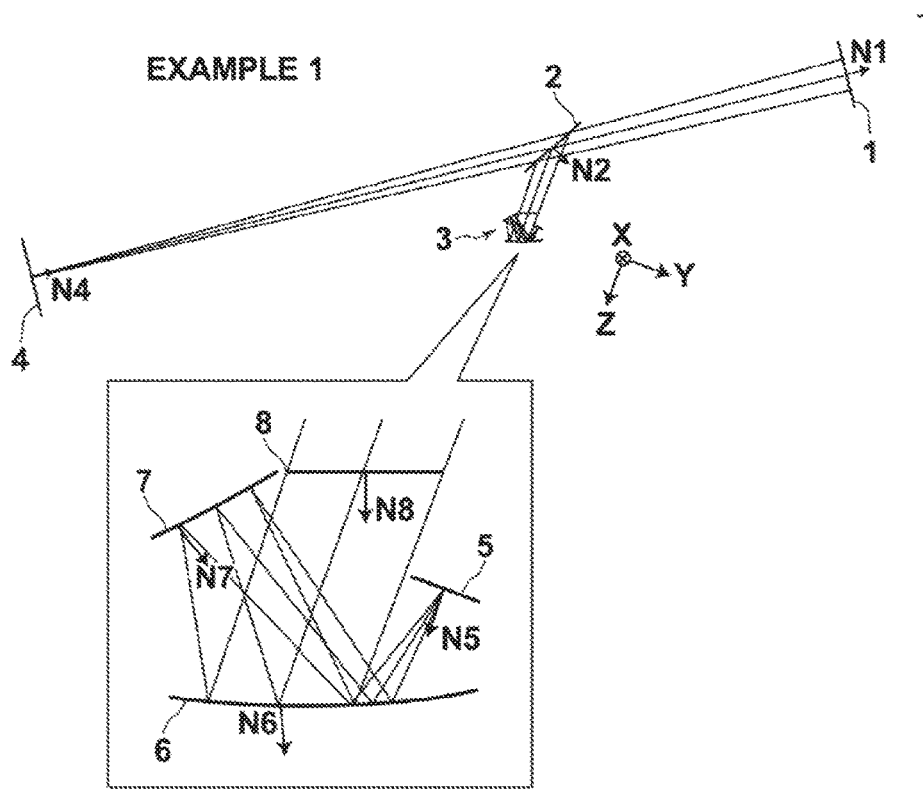
FIG. 5 is a schematic diagram that illustrates the configuration of a greater distance optical system of the head up display apparatus of Example 1.

Next, examples of numerical values for the head up display apparatus of the present disclosure will be described. First, a head up display apparatus of Example 1 will be described. FIG. 5 is a schematic diagram that illustrates the configuration of the head up display apparatus of Example 1.

Table 1 shows data related to various items. Here, the values of the FOV (Field Of View), [Horizontal Direction H·Vertical Direction V] (°), the entrance pupil size (mm·mm), the virtual image distance (mm), the image display region (mm·mm), and the inclination angle of an image display region(°) are shown in Table 1. Note that the inclination angle of an image display region refers to the inclination of the image display surface 5 at a position where the central light beam of the display light is output from the image display surface 5 when the direction perpendicular to the central light beam is designated as 0°.

Table 2 shows arrangement coordinate data for each component that constitutes the head up display apparatus. Here, coordinate data are shown for both an absolute coordinate system having the center of the image display surface 5 illustrated in FIG. 5 as its origin, and local coordinate systems which are set on the surfaces of the first mirror 6, the second mirror 7, and the aperture 8.

Note that the local coordinate systems are set as follows. The component vectors of the origin of each local coordinate system are designated as (x, y, z) and (i, j, k) in the absolute coordinate system. In addition, a plane (XY plane) that passes through the origins of the local coordinate systems and is perpendicular to the Z axis is designated as the reference surface for each component element. Vectors N of lines which are normal to each of the reference planes match the Z axis. In addition, the X axis is perpendicular to the drawing sheet of FIG. 5, and the direction of depth into the drawing sheet is designated as the positive side. In addition, the Y axis and the Z axis are parallel to the drawing sheet of FIG. 5. In addition, the Y axis is set to match the cross product of the Z axis and the X axis. In addition, the reference surfaces of the first mirror and the second mirror 7 have paraxial curvatures, and a freely curved surface shape is set as an added shape on the reference surfaces. In addition, a rectangular aperture having the X axis as its long side and the Y axis as its short side is set in the reference surface of the component element having an aperture value. In addition, in the first mirror 6 and the second mirror 7, regions onto which the aperture of the references surface is projected onto the freely curved surfaces along a line normal to the reference surface are designated as reflection surfaces. Note that among the data for Examples 1 through 8 to be described later, there are data related to the component elements having aperture values in which the centers of the apertures are shifted in the direction of the Y axis on the reference surfaces.

In addition, the first mirror 6 and the second mirror 7 are mirrors having power. Data related to freely curved surface coefficients are shown in Table 3. The freely curved surface coefficients are the values of rotationally asymmetrical aspherical surface coefficients (i, j) in the freely curved surface formula represented by the equation below. Note that the values of rotationally asymmetrical aspherical surface coefficients which are not specifically shown in Table 3 are zero.

$$Z = \Sigma_i \Sigma_j C(i,j) X^i Y^j$$

wherein X, Y, and Z are coordinates having the apex of the surface as the origin, and C(i,j) are rotationally asymmetrical aspherical surface coefficients (i+j=k, k=1~10).

TABLE 1

| | Example 1 |
|---|---|
| FOV [H × V] | 5° × 1.5° |
| Entrance Pupil Size [mm × mm] | 180 × 40 |
| Virtual Image Distance [mm] | 2500 |
| Image Display Region [mm × mm] | 33.3 × 10 |
| Angle of Image Display Region | 12.1° |

TABLE 2

Example 1

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −41.50 | 60.00 | 0.0000 | 0.4226 | 0.9063 | 240 | 90 | 11 |
| Second Mirror | 0.00 | −98.95 | 11.79 | 0.0000 | 0.8480 | 0.5299 | 180 | 45 | 18.4 |
| Aperture | 0.00 | −41.50 | −30.00 | 0.0000 | 0.3420 | 0.9397 | 200 | 57 | |
| Windshield | 0.00 | −41.50 | −240.00 | 0.0000 | 0.8829 | 0.4695 | | | |
| Pupil | 0.00 | 704.63 | −743.27 | 0.0000 | 0.8290 | −0.5592 | | | |
| Virtual Image | 0.00 | −1367.96 | 654.71 | 0.0000 | 0.8290 | −0.5592 | | | |

TABLE 3

Example 1

| C(i, j) | | First Mirror | Second Mirror |
|---|---|---|---|
| | | Paraxial Radius of Curvature | |
| | | 867.3848462 | 319.715608 |
| 1 | 0 | 0.0000000000E+00 | 0.0000000000E+00 |
| 0 | 1 | 1.0765137499E−01 | 2.1277285341E−01 |
| 2 | 0 | −1.6177715206E−03 | −1.8576572529E−03 |
| 1 | 1 | 0.0000000000E+00 | 0.0000000000E+00 |
| 0 | 2 | −1.7793817539E−03 | −2.9902589540E−03 |
| 3 | 0 | 0.0000000000E+00 | 0.0000000000E+00 |
| 2 | 1 | 3.1255441109E−06 | 8.2728136108E−06 |
| 1 | 2 | 0.0000000000E+00 | 0.0000000000E+00 |
| 0 | 3 | 2.1766301795E−06 | 1.6552973392E−05 |
| 4 | 0 | 3.5983459846E−09 | −9.2552620172E−09 |
| 3 | 1 | 0.0000000000E+00 | 0.0000000000E+00 |
| 2 | 2 | 3.0903715801E−09 | 1.3336145570E−08 |
| 1 | 3 | 0.0000000000E+00 | 0.0000000000E+00 |
| 0 | 4 | −5.1042361299E−09 | −1.6694997332E−07 |
| 5 | 0 | 0.0000000000E+00 | 0.0000000000E+00 |
| 4 | 1 | −2.2416088185E−11 | 1.5539545412E−09 |
| 3 | 2 | 0.0000000000E+00 | 0.0000000000E+00 |
| 2 | 3 | −2.4322065162E−10 | 6.4067557597E−10 |
| 1 | 4 | 0.0000000000E+00 | 0.0000000000E+00 |
| 0 | 5 | 2.6220479916E−10 | −7.1632085373E−09 |
| 6 | 0 | −3.2579408104E−13 | 5.1674477648E−12 |
| 5 | 1 | 0.0000000000E+00 | 0.0000000000E+00 |
| 4 | 2 | −4.1517294137E−12 | −5.6898045286E−11 |
| 3 | 3 | 0.0000000000E+00 | 0.0000000000E+00 |
| 2 | 4 | −2.1347531618E−12 | 9.0114819260E−11 |
| 1 | 5 | 0.0000000000E+00 | 0.0000000000E+00 |
| 0 | 6 | −9.9835746383E−12 | 9.8776986147E−11 |
| 7 | 0 | 0.0000000000E+00 | 0.0000000000E+00 |
| 6 | 1 | −5.7366597479E−15 | −1.6659919714E−13 |
| 5 | 2 | 0.0000000000E+00 | 0.0000000000E+00 |
| 3 | 4 | 5.8140556840E−14 | −1.2894450828E−12 |
| 4 | 3 | 0.0000000000E+00 | 0.0000000000E+00 |
| 2 | 5 | 1.8602664414E−13 | −1.2407902176E−12 |
| 1 | 6 | 0.0000000000E+00 | 0.0000000000E+00 |
| 0 | 7 | −1.2579761254E−13 | 2.6874113535E−12 |
| 8 | 0 | 1.0444514030E−16 | −1.2152073024E−16 |
| 7 | 1 | 0.0000000000E+00 | 0.0000000000E+00 |
| 6 | 2 | 4.1979953148E−16 | 5.0869384998E−15 |
| 5 | 3 | 0.0000000000E+00 | 0.0000000000E+00 |
| 4 | 4 | −7.2134163672E−16 | 5.2118799422E−14 |
| 3 | 5 | 0.0000000000E+00 | 0.0000000000E+00 |
| 2 | 6 | 3.3041306756E−16 | −8.3659378771E−14 |
| 1 | 7 | 0.0000000000E+00 | 0.0000000000E+00 |
| 0 | 8 | −3.3796607433E−16 | −5.9512988135E−15 |
| 9 | 0 | 0.0000000000E+00 | 0.0000000000E+00 |
| 8 | 1 | 3.6920267941E−20 | 5.3642821296E−18 |
| 7 | 2 | 0.0000000000E+00 | 0.0000000000E+00 |
| 6 | 3 | −2.3215907569E−18 | 6.8654728154E−17 |
| 5 | 4 | 0.0000000000E+00 | 0.0000000000E+00 |
| 4 | 5 | −6.7658068621E−18 | 2.8357596234E−16 |
| 3 | 6 | 0.0000000000E+00 | 0.0000000000E+00 |
| 2 | 7 | −5.9059991385E−17 | −6.4636474973E−16 |
| 1 | 8 | 0.0000000000E+00 | 0.0000000000E+00 |
| 0 | 9 | −1.5781536198E−17 | 1.0590840543E−15 |
| 10 | 0 | −5.4188858810E−21 | −1.7463250617E−20 |
| 9 | 1 | 0.0000000000E+00 | 0.0000000000E+00 |
| 8 | 2 | −6.6703954925E−21 | −3.7946666856E−19 |
| 7 | 3 | 0.0000000000E+00 | 0.0000000000E+00 |
| 6 | 4 | −1.1116406941E−19 | −9.6297183782E−19 |
| 5 | 5 | 0.0000000000E+00 | 0.0000000000E+00 |
| 4 | 6 | 8.3367436789E−19 | −1.9368237446E−17 |
| 3 | 7 | 0.0000000000E+00 | 0.0000000000E+00 |
| 2 | 8 | −5.6003667233E−19 | 5.8276895609E−17 |
| 1 | 9 | 0.0000000000E+00 | 0.0000000000E+00 |
| 0 | 10 | 4.5963094116E−19 | −5.3967725874E−17 |

The symbols, the meanings, and the manners in which the data described in connection with Example 1 above are the same for the Examples below unless stated otherwise. Therefore, redundant descriptions will be omitted below.

Figure 6:
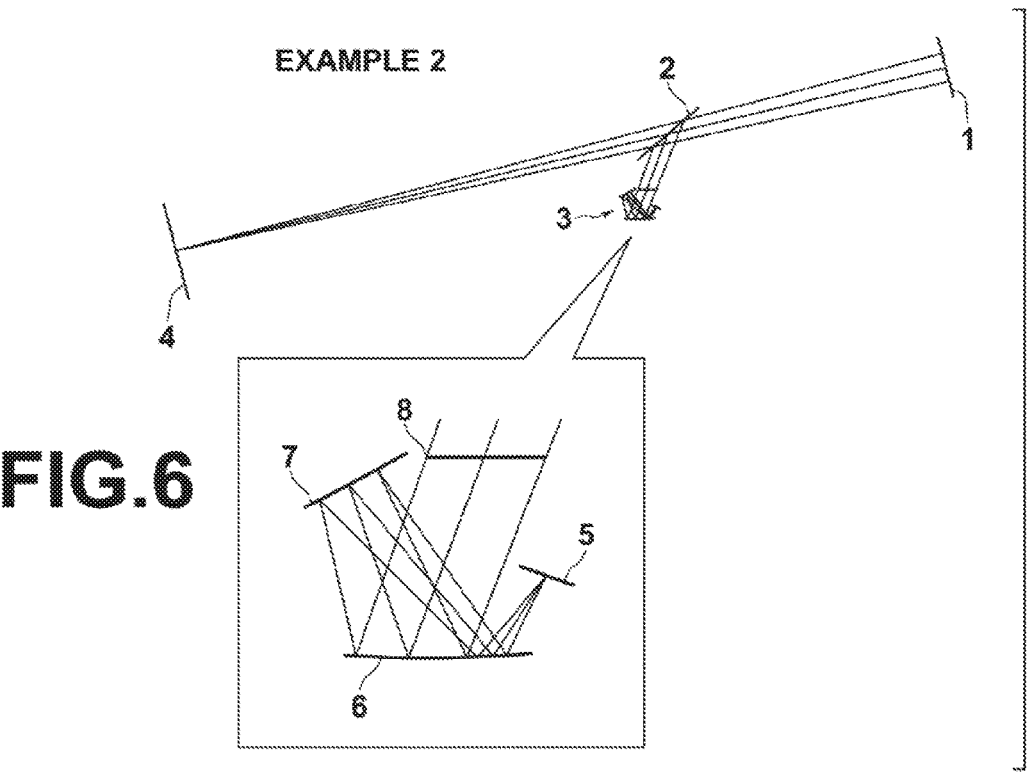
FIG. 6 is a schematic diagram that illustrates the configuration of a greater distance optical system of the head up display apparatus of Example 2.

Next, a head up display apparatus of Example 2 will be described. FIG. 6 is a schematic diagram that illustrates the configuration of the head up display apparatus of Example 2. In addition, data related to various items are shown in Table 4, arrangement coordinate data of each component element are shown in Table 5, and data related to the freely curved surface coefficients of each of the mirrors are shown in Table 6 for the head up display apparatus of Example 2.

TABLE 4

Example 2

| | |
|---|---|
| FOV [H × V] | 7° × 1.5° |
| Entrance Pupil Size [mm × mm] | 180 × 40 |
| Virtual Image Distance [mm] | 2500 |
| Image Display Region [mm × mm] | 50 × 10.7 |
| Angle of Image Display Region | 12.9° |

TABLE 5

Example 2

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −46.90 | 60.00 | 0.0000 | 0.3420 | 0.9397 | 260 | 90 | 13 |
| Second Mirror | 0.00 | −104.75 | −8.94 | 0.0000 | 0.7660 | 0.6428 | 220 | 56 | 5.45 |
| Aperture | 0.00 | −46.90 | −45.00 | 0.0000 | 0.3420 | 0.9397 | 240 | 57 | |
| Windshield | 0.00 | −46.90 | −240.00 | 0.0000 | 0.8829 | 0.4695 | | | |
| Pupil | 0.00 | 699.23 | −743.27 | 0.0000 | 0.8290 | −0.5592 | | | |
| Virtual Image | 0.00 | −1373.36 | 654.71 | 0.0000 | 0.8290 | −0.5592 | | | |

TABLE 6

Example 2

| | | First Mirror | Second Mirror |
|---|---|---|---|
| | | \multicolumn{2}{c}{Paraxial Radius of Curvature} | |
| C(i, j) | | −621.9504227 | −1684.970667 |
| 1 | 0 | 0.0000000000E+00 | 0.0000000000E+00 |
| 0 | 1 | 1.1168140959E−02 | 2.1834036609E−02 |
| 2 | 0 | 6.7766214286E−05 | 5.3923165536E−04 |
| 1 | 1 | 0.0000000000E+00 | 0.0000000000E+00 |
| 0 | 2 | −5.2187510495E−06 | 9.1491582801E−05 |
| 3 | 0 | 0.0000000000E+00 | 0.0000000000E+00 |
| 2 | 1 | 1.6418305697E−06 | 4.7003238104E−06 |
| 1 | 2 | 0.0000000000E+00 | 0.0000000000E+00 |
| 0 | 3 | 2.7553244917E−07 | −1.2638345538E−06 |
| 4 | 0 | 5.3560197728E−09 | 1.3028970933E−08 |
| 3 | 1 | 0.0000000000E+00 | 0.0000000000E+00 |
| 2 | 2 | 2.3319417377E−09 | 2.3437905806E−08 |
| 1 | 3 | 0.0000000000E+00 | 0.0000000000E+00 |
| 0 | 4 | −6.1250736091E−09 | −5.2470024717E−08 |
| 5 | 0 | 0.0000000000E+00 | 0.0000000000E+00 |
| 4 | 1 | 3.4338641260E−13 | −6.8443487267E−11 |
| 3 | 2 | 0.0000000000E+00 | 0.0000000000E+00 |
| 2 | 3 | 2.7900858527E−11 | 3.4792578435E−10 |
| 1 | 4 | 0.0000000000E+00 | 0.0000000000E+00 |
| 0 | 5 | 2.1183924808E−12 | −8.5341605426E−10 |
| 6 | 0 | −2.5699473776E−14 | −4.2143869439E−14 |
| 5 | 1 | 0.0000000000E+00 | 0.0000000000E+00 |
| 4 | 2 | 7.7748746614E−14 | −1.3415203669E−12 |
| 3 | 3 | 0.0000000000E+00 | 0.0000000000E+00 |
| 2 | 4 | −2.0961319432E−13 | 6.0439377591E−12 |
| 1 | 5 | 0.0000000000E+00 | 0.0000000000E+00 |
| 0 | 6 | −1.1277253884E−13 | −2.3573989340E−11 |
| 7 | 0 | 0.0000000000E+00 | 0.0000000000E+00 |
| 6 | 1 | −2.4043113740E−15 | −7.4206458740E−15 |
| 5 | 2 | 0.0000000000E+00 | 0.0000000000E+00 |
| 3 | 4 | 8.2010228448E−16 | −1.9149653380E−14 |
| 4 | 3 | 0.0000000000E+00 | 0.0000000000E+00 |
| 2 | 5 | −2.1009474458E−14 | 6.6848412787E−14 |
| 1 | 6 | 0.0000000000E+00 | 0.0000000000E+00 |
| 0 | 7 | −2.1341956018E−14 | −2.8962820790E−13 |
| 8 | 0 | 4.8939797892E−18 | 7.4473824711E−18 |
| 7 | 1 | 0.0000000000E+00 | 0.0000000000E+00 |
| 6 | 2 | −8.9986935452E−18 | −7.5638824714E−17 |
| 5 | 3 | 0.0000000000E+00 | 0.0000000000E+00 |
| 4 | 4 | 5.2238077874E−17 | 3.0178584596E−16 |
| 3 | 5 | 0.0000000000E+00 | 0.0000000000E+00 |
| 2 | 6 | −3.6970843599E−17 | 4.2450902149E−15 |
| 1 | 7 | 0.0000000000E+00 | 0.0000000000E+00 |
| 0 | 8 | −6.6278426539E−16 | −4.8293981048E−15 |
| 9 | 0 | 0.0000000000E+00 | 0.0000000000E+00 |
| 8 | 1 | 2.6813275356E−20 | 2.7481585383E−19 |
| 7 | 2 | 0.0000000000E+00 | 0.0000000000E+00 |
| 6 | 3 | 1.2999901639E−19 | 7.3234661231E−19 |
| 5 | 4 | 0.0000000000E+00 | 0.0000000000E+00 |
| 4 | 5 | −8.6098350740E−19 | −1.2530200610E−17 |
| 3 | 6 | 0.0000000000E+00 | 0.0000000000E+00 |
| 2 | 7 | 7.7154499360E−18 | −5.3789146815E−17 |
| 1 | 8 | 0.0000000000E+00 | 0.0000000000E+00 |
| 0 | 9 | −1.5203207937E−17 | −1.3855373544E−16 |
| 10 | 0 | −1.0392772807E−22 | −3.9456903438E−22 |
| 9 | 1 | 0.0000000000E+00 | 0.0000000000E+00 |
| 8 | 2 | 3.8936475570E−22 | 4.4592868170E−21 |
| 7 | 3 | 0.0000000000E+00 | 0.0000000000E+00 |
| 6 | 4 | 2.5038684070E−21 | 2.3128530196E−20 |
| 5 | 5 | 0.0000000000E+00 | 0.0000000000E+00 |
| 4 | 6 | −2.9744264747E−20 | −2.0795239022E−19 |
| 3 | 7 | 0.0000000000E+00 | 0.0000000000E+00 |
| 2 | 8 | 2.3789417997E−19 | 2.6197768853E−18 |
| 1 | 9 | 0.0000000000E+00 | 0.0000000000E+00 |
| 0 | 10 | 3.2233673512E−20 | 8.3834082982E−19 |

Figure 7:
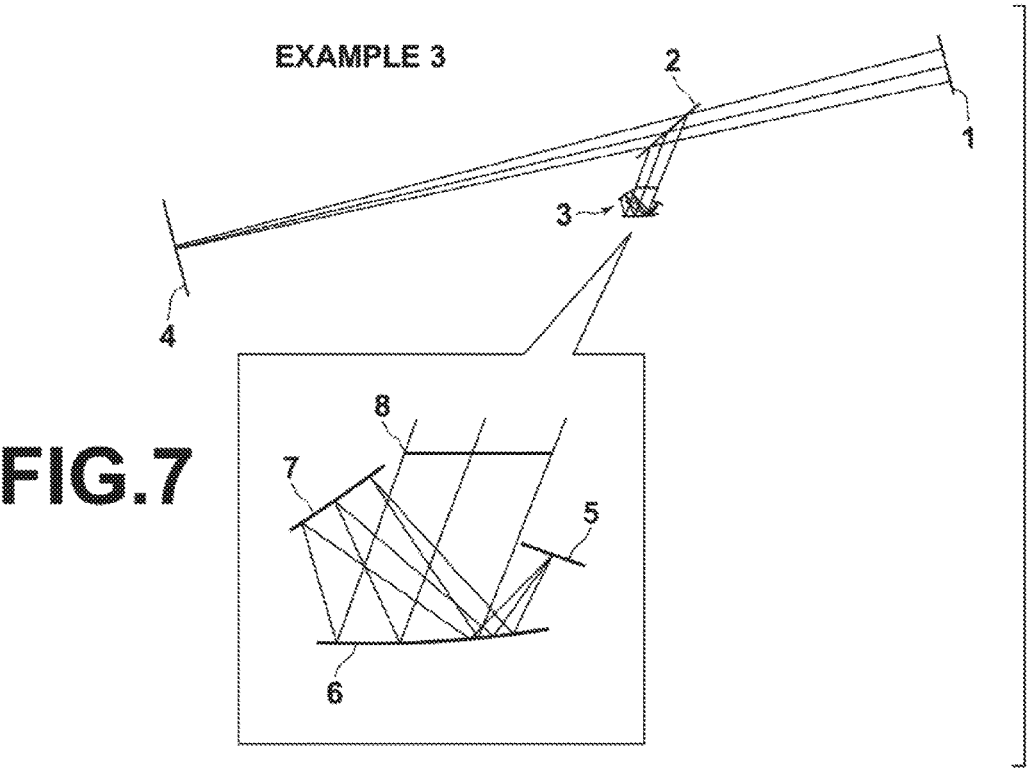
FIG. 7 is a schematic diagram that illustrates the configuration of a greater distance optical system of the head up display apparatus of Example 3.

Next, a head up display apparatus of Example 3 will be described. FIG. 7 is a schematic diagram that illustrates the configuration of the head up display apparatus of Example 3. In addition, data related to various items are shown in Table 7, arrangement coordinate data of each component element are shown in Table 8, and data related to the freely curved surface coefficients of each of the mirrors are shown in Table 9 for the head up display apparatus of Example 3.

TABLE 7

Example 3

| | |
|---|---|
| FOV [H × V] | 7° × 2° |
| Entrance Pupil Size [mm × mm] | 180 × 40 |
| Virtual Image Distance [mm] | 2500 |
| Image Display Region [mm × mm] | 44 × 12.57 |
| Angle of Image Display Region | 14.9° |

TABLE 8

Example 3

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −50.35 | 65.00 | 0.0000 | 0.3420 | 0.9397 | 260 | 110 | 12.5 |
| Second Mirror | 0.00 | −101.77 | 3.72 | 0.0000 | 0.7771 | 0.6293 | 240 | 55 | −6.35 |
| Aperture | 0.00 | −50.35 | −35.00 | 0.0000 | 0.3420 | 0.9397 | 240 | 70 | |
| Windshield | 0.00 | −50.35 | −235.00 | 0.0000 | 0.8829 | 0.4695 | | | |
| Pupil | 0.00 | 695.78 | −738.27 | 0.0000 | 0.8290 | −0.5592 | | | |
| Virtual Image | 0.00 | −1376.81 | 659.71 | 0.0000 | 0.8290 | −0.5592 | | | |

TABLE 9

Example 3

| | | First Mirror | Second Mirror |
|---|---|---|---|
| | | Paraxial Radius of Curvature | |
| C(i, j) | | −567.4742522 | −3912.500574 |
| 1 | 0 | 0.0000000000E+00 | 0.0000000000E+00 |
| 0 | 1 | −3.8382647198E−02 | −9.2419705383E−02 |
| 2 | 0 | 2.8060538189E−04 | 7.6776769398E−04 |
| 1 | 1 | 0.0000000000E+00 | 0.0000000000E+00 |
| 0 | 2 | −9.8867613940E−05 | −2.6765911087E−04 |
| 3 | 0 | 0.0000000000E+00 | 0.0000000000E+00 |
| 2 | 1 | −2.3412123141E−07 | 6.2082933385E−08 |
| 1 | 2 | 0.0000000000E+00 | 0.0000000000E+00 |
| 0 | 3 | 1.9433097568E−06 | 8.2335037694E−06 |
| 4 | 0 | 3.7297608258E−09 | 8.7568142119E−09 |
| 3 | 1 | 0.0000000000E+00 | 0.0000000000E+00 |
| 2 | 2 | 3.8953149965E−09 | −6.1864492911E−08 |
| 1 | 3 | 0.0000000000E+00 | 0.0000000000E+00 |
| 0 | 4 | 2.4368668306E−08 | −7.3514634797E−08 |
| 5 | 0 | 0.0000000000E+00 | 0.0000000000E+00 |
| 4 | 1 | 7.3780964332E−13 | −1.0894433914E−10 |
| 3 | 2 | 0.0000000000E+00 | 0.0000000000E+00 |
| 2 | 3 | −4.3237161052E−10 | −2.3594048392E−09 |
| 1 | 4 | 0.0000000000E+00 | 0.0000000000E+00 |
| 0 | 5 | −3.6662769220E−10 | −1.5089276721E−08 |
| 6 | 0 | 3.4453143407E−13 | 8.7639872859E−14 |
| 5 | 1 | 0.0000000000E+00 | 0.0000000000E+00 |
| 4 | 2 | −1.7350866680E−12 | −1.9004770260E−12 |
| 3 | 3 | 0.0000000000E+00 | 0.0000000000E+00 |
| 2 | 4 | 3.4155926775E−12 | 9.6026303556E−11 |
| 1 | 5 | 0.0000000000E+00 | 0.0000000000E+00 |
| 0 | 6 | −1.3159906366E−11 | −5.9793645275E−11 |
| 7 | 0 | 0.0000000000E+00 | 0.0000000000E+00 |
| 6 | 1 | −7.0289343191E−15 | −7.5008017904E−15 |
| 5 | 2 | 0.0000000000E+00 | 0.0000000000E+00 |
| 3 | 4 | 9.7779535187E−15 | 2.0972632045E−13 |
| 4 | 3 | 0.0000000000E+00 | 0.0000000000E+00 |
| 2 | 5 | 1.5775075931E−13 | 3.0947741017E−12 |
| 1 | 6 | 0.0000000000E+00 | 0.0000000000E+00 |
| 0 | 7 | −1.6791027329E−13 | 1.7019923381E−11 |
| 8 | 0 | −2.4002949875E−17 | −2.5216062307E−17 |
| 7 | 1 | 0.0000000000E+00 | 0.0000000000E+00 |
| 6 | 2 | 1.7257053512E−16 | 2.7862306892E−16 |
| 5 | 3 | 0.0000000000E+00 | 0.0000000000E+00 |
| 4 | 4 | 1.4185577291E−17 | 4.7793015898E−16 |
| 3 | 5 | 0.0000000000E+00 | 0.0000000000E+00 |
| 2 | 6 | −4.8443070766E−17 | −3.6439575081E−14 |
| 1 | 7 | 0.0000000000E+00 | 0.0000000000E+00 |
| 0 | 8 | 9.7628809401E−16 | −2.4048063912E−13 |
| 9 | 0 | 0.0000000000E+00 | 0.0000000000E+00 |
| 8 | 1 | 2.0214580869E−19 | 5.4000187989E−19 |
| 7 | 2 | 0.0000000000E+00 | 0.0000000000E+00 |
| 6 | 3 | −4.0152062144E−19 | −1.6220109328E−17 |
| 5 | 4 | 0.0000000000E+00 | 0.0000000000E+00 |

TABLE 9-continued

Example 3

| | | First Mirror | Second Mirror |
|---|---|---|---|
| | | Paraxial Radius of Curvature | |
| C(i, j) | | −567.4742522 | −3912.500574 |
| 4 | 5 | −8.8320585836E−19 | 2.4007612587E−17 |
| 3 | 6 | 0.0000000000E+00 | 0.0000000000E+00 |
| 2 | 7 | 2.7922593806E−18 | −2.0975952667E−15 |
| 1 | 8 | 0.0000000000E+00 | 0.0000000000E+00 |
| 0 | 9 | 1.3229302098E−16 | −4.0011928813E−14 |
| 10 | 0 | 6.3362819185E−22 | 1.0360501123E−21 |
| 9 | 1 | 0.0000000000E+00 | 0.0000000000E+00 |
| 8 | 2 | −3.8797343445E−21 | −6.5442030068E−21 |
| 7 | 3 | 0.0000000000E+00 | 0.0000000000E+00 |
| 6 | 4 | −2.7871326376E−20 | −4.0644143936E−19 |
| 5 | 5 | 0.0000000000E+00 | 0.0000000000E+00 |
| 4 | 6 | 2.0999580904E−19 | 3.7857283880E−18 |
| 3 | 7 | 0.0000000000E+00 | 0.0000000000E+00 |
| 2 | 8 | −1.3773653527E−18 | −3.2383200927E−17 |
| 1 | 9 | 0.0000000000E+00 | 0.0000000000E+00 |
| 0 | 10 | −1.1690373774E−18 | −7.0911387099E−16 |

Next, a head up display apparatus of Example 4 will be described. FIG. 8 is a schematic diagram that illustrates the configuration of the head up display apparatus of Example 4. In addition, data related to various items are shown in Table 10, arrangement coordinate data of each component element are shown in Table 11, and data related to the freely curved surface coefficients of each of the mirrors are shown in Table 12 for the head up display apparatus of Example 4.

TABLE 10

Example 4

| | |
|---|---|
| FOV [H × V] | 9° × 3° |
| Entrance Pupil Size [mm × mm] | 180 × 40 |
| Virtual Image Distance [mm] | 2500 |
| Image Display Region [mm × mm] | 85.7 × 28.57 |
| Angle of Image Display Region | 15.0° |

TABLE 11

Example 4

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −70.00 | 90.00 | 0.0000 | 0.3746 | 0.9272 | 300 | 150 | 23 |
| Second Mirror | 0.00 | −149.89 | 7.28 | 0.0000 | 0.8572 | 0.5150 | 280 | 80 | |
| Aperture | 0.00 | −70.00 | −45.00 | 0.0000 | 0.3420 | 0.9397 | 280 | 87 | |
| Windshield | 0.00 | −70.00 | −230.00 | 0.0000 | 0.8829 | 0.4695 | | | |
| Pupil | 0.00 | 676.13 | −733.27 | 0.0000 | 0.8290 | −0.5592 | | | |
| Virtual Image | 0.00 | −1396.46 | 664.71 | 0.0000 | 0.8290 | −0.5592 | | | |

TABLE 12

Example 4

| | | First Mirror | Second Mirror |
|---|---|---|---|
| | | \multicolumn{2}{c}{Paraxial Radius of Curvature} | |
| C(i, j) | | −913.6671994 | −1961.0695 |
| 1 | 0 | 0.0000000000E+00 | 0.0000000000E+00 |
| 0 | 1 | 1.2237560411E−02 | 9.6652802168E−02 |
| 2 | 0 | 7.8790347918E−05 | 4.8710620668E−04 |
| 1 | 1 | 0.0000000000E+00 | 0.0000000000E+00 |
| 0 | 2 | −1.4435116278E−05 | 9.8011399225E−05 |
| 3 | 0 | 0.0000000000E+00 | 0.0000000000E+00 |
| 2 | 1 | −2.4820714896E−07 | −4.8067136421E−07 |
| 1 | 2 | 0.0000000000E+00 | 0.0000000000E+00 |
| 0 | 3 | 1.0983157566E−07 | 2.6476083084E−07 |
| 4 | 0 | 2.3431178607E−09 | 6.2114853397E−09 |
| 3 | 1 | 0.0000000000E+00 | 0.0000000000E+00 |
| 2 | 2 | −3.9091111166E−09 | −1.4183142943E−08 |
| 1 | 3 | 0.0000000000E+00 | 0.0000000000E+00 |
| 0 | 4 | −4.5887974520E−09 | −1.6584266507E−08 |
| 5 | 0 | 0.0000000000E+00 | 0.0000000000E+00 |
| 4 | 1 | −4.9304897264E−12 | −3.1162311190E−11 |
| 3 | 2 | 0.0000000000E+00 | 0.0000000000E+00 |
| 2 | 3 | −7.3944839458E−11 | −5.8826388886E−10 |
| 1 | 4 | 0.0000000000E+00 | 0.0000000000E+00 |
| 0 | 5 | 1.2698035987E−11 | −4.6472227834E−10 |
| 6 | 0 | 3.4610195637E−14 | 4.3982354468E−14 |
| 5 | 1 | 0.0000000000E+00 | 0.0000000000E+00 |
| 4 | 2 | −7.4563260598E−14 | −1.0238744237E−13 |
| 3 | 3 | 0.0000000000E+00 | 0.0000000000E+00 |
| 2 | 4 | −3.1471416439E−13 | −9.4752786545E−12 |
| 1 | 5 | 0.0000000000E+00 | 0.0000000000E+00 |
| 0 | 6 | 2.2884759466E−13 | −2.7398684928E−12 |
| 7 | 0 | 0.0000000000E+00 | 0.0000000000E+00 |
| 6 | 1 | −7.2253333858E−16 | −3.2833750008E−16 |
| 5 | 2 | 0.0000000000E+00 | 0.0000000000E+00 |
| 3 | 4 | −9.7819180945E−16 | 1.4498801988E−14 |
| 4 | 3 | 0.0000000000E+00 | 0.0000000000E+00 |
| 2 | 5 | −2.0911942921E−15 | −2.3560809097E−14 |
| 1 | 6 | 0.0000000000E+00 | 0.0000000000E+00 |
| 0 | 7 | 2.8714464436E−15 | 4.7255316259E−14 |
| 8 | 0 | 1.0078067322E−19 | −1.4250656925E−18 |
| 7 | 1 | 0.0000000000E+00 | 0.0000000000E+00 |
| 6 | 2 | 1.8634367878E−18 | −1.3623603667E−17 |
| 5 | 3 | 0.0000000000E+00 | 0.0000000000E+00 |
| 4 | 4 | 1.9683490951E−17 | −2.9173125785E−17 |
| 3 | 5 | 0.0000000000E+00 | 0.0000000000E+00 |
| 2 | 6 | 5.0923633866E−17 | 1.6950213147E−15 |
| 1 | 7 | 0.0000000000E+00 | 0.0000000000E+00 |
| 0 | 8 | 1.9142552113E−17 | 3.9408838489E−17 |
| 9 | 0 | 0.0000000000E+00 | 0.0000000000E+00 |
| 8 | 1 | −8.9500952520E−21 | −6.4609458661E−20 |
| 7 | 2 | 0.0000000000E+00 | 0.0000000000E+00 |
| 6 | 3 | 3.3983076788E−20 | −1.7118997838E−19 |
| 5 | 4 | 0.0000000000E+00 | 0.0000000000E+00 |

TABLE 12-continued

Example 4

| | | First Mirror | Second Mirror |
|---|---|---|---|
| | | \multicolumn{2}{c}{Paraxial Radius of Curvature} | |
| C(i, j) | | −913.6671994 | −1961.0695 |
| 4 | 5 | 8.3139042180E−19 | 4.4641836955E−19 |
| 3 | 6 | 0.0000000000E+00 | 0.0000000000E+00 |
| 2 | 7 | −9.6927424078E−19 | −2.3282529549E−17 |
| 1 | 8 | 0.0000000000E+00 | 0.0000000000E+00 |
| 0 | 9 | −2.3715785551E−19 | 2.2353243736E−17 |
| 10 | 0 | −3.3455311200E−23 | −8.7317487549E−23 |
| 9 | 1 | 0.0000000000E+00 | 0.0000000000E+00 |
| 8 | 2 | 4.3028202327E−22 | 1.1809864898E−21 |
| 7 | 3 | 0.0000000000E+00 | 0.0000000000E+00 |
| 6 | 4 | −2.5122110876E−21 | −7.9421535407E−21 |
| 5 | 5 | 0.0000000000E+00 | 0.0000000000E+00 |
| 4 | 6 | 4.9055511019E−21 | 5.7262602544E−20 |
| 3 | 7 | 0.0000000000E+00 | 0.0000000000E+00 |
| 2 | 8 | −2.6808139831E−20 | −1.1981085768E−18 |
| 1 | 9 | 0.0000000000E+00 | 0.0000000000E+00 |
| 0 | 10 | −6.7230589661E−21 | −7.8874728473E−19 |

Next, a head up display apparatus of Example 5 will be described. FIG. 9 is a schematic diagram that illustrates the configuration of the head up display apparatus of Example 5. In addition, data related to various items are shown in Table 13, arrangement coordinate data of each component element are shown in Table 14, and data related to the freely curved surface coefficients of each of the mirrors are shown in Table 15 for the head up display apparatus of Example 5.

TABLE 13

Example 5

| | |
|---|---|
| FOV [H × V] | 9° × 4.5° |
| Entrance Pupil Size [mm × mm] | 180 × 40 |
| Virtual Image Distance [mm] | 2500 |
| Image Display Region [mm × mm] | 74 × 37 |
| Angle of Image Display Region | 18.7° |

TABLE 14

Example 5

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −105.00 | 130.00 | 0.0000 | 0.3746 | 0.9272 | 360 | 210 | 26.5 |
| Second Mirror | 0.00 | −209.20 | 22.10 | 0.0000 | 0.8387 | 0.5446 | 350 | 128 | −11.5 |
| Aperture | 0.00 | −105.00 | −45.00 | 0.0000 | 0.3420 | 0.9397 | 330 | 130 | |
| Windshield | 0.00 | −105.00 | −270.00 | 0.0000 | 0.8829 | 0.4695 | | | |
| Pupil | 0.00 | 641.13 | −773.27 | 0.0000 | 0.8290 | −0.5592 | | | |
| Virtual Image | 0.00 | −3504.05 | 2022.69 | 0.0000 | 0.8290 | −0.5592 | | | |

TABLE 15

Example 5

| | | First Mirror | Second Mirror |
|---|---|---|---|
| | | Paraxial Radius of Curvature | |
| C(i, j) | | −1506.040452 | −18925.54377 |
| 1 | 0 | 0.0000000000E+00 | 0.0000000000E+00 |
| 0 | 1 | −3.2815342514E−02 | −3.2893791442E−02 |
| 2 | 0 | 4.0494579859E−05 | 4.2349181179E−04 |
| 1 | 1 | 0.0000000000E+00 | 0.0000000000E+00 |
| 0 | 2 | 7.3597148980E−06 | 3.3851048660E−04 |
| 3 | 0 | 0.0000000000E+00 | 0.0000000000E+00 |
| 2 | 1 | −4.4474202712E−07 | −8.2393642921E−07 |
| 1 | 2 | 0.0000000000E+00 | 0.0000000000E+00 |
| 0 | 3 | 4.5160677920E−07 | 1.1560713451E−06 |
| 4 | 0 | 9.6123352598E−10 | 1.6807868869E−09 |
| 3 | 1 | 0.0000000000E+00 | 0.0000000000E+00 |
| 2 | 2 | −7.1004964468E−10 | −6.6393092648E−09 |
| 1 | 3 | 0.0000000000E+00 | 0.0000000000E+00 |
| 0 | 4 | −1.2721574726E−10 | 1.8245520059E−09 |
| 5 | 0 | 0.0000000000E+00 | 0.0000000000E+00 |
| 4 | 1 | −7.6110897300E−12 | −1.6142827202E−11 |
| 3 | 2 | 0.0000000000E+00 | 0.0000000000E+00 |
| 2 | 3 | −1.3257090035E−11 | −7.5411627730E−11 |
| 1 | 4 | 0.0000000000E+00 | 0.0000000000E+00 |
| 0 | 5 | −3.6826924365E−12 | 4.7249661547E−11 |
| 6 | 0 | 1.4138952022E−14 | 5.5909634636E−15 |
| 5 | 1 | 0.0000000000E+00 | 0.0000000000E+00 |
| 4 | 2 | 9.0381306033E−14 | 2.1467108769E−13 |
| 3 | 3 | 0.0000000000E+00 | 0.0000000000E+00 |
| 2 | 4 | 6.1294152233E−15 | −1.2196797702E−12 |
| 1 | 5 | 0.0000000000E+00 | 0.0000000000E+00 |
| 0 | 6 | 1.7562354589E−14 | −1.5338881701E−12 |
| 7 | 0 | 0.0000000000E+00 | 0.0000000000E+00 |
| 6 | 1 | −1.9332150846E−16 | 1.6160644011E−16 |
| 5 | 2 | 0.0000000000E+00 | 0.0000000000E+00 |
| 3 | 4 | −5.8546000866E−16 | −3.0592861446E−15 |
| 4 | 3 | 0.0000000000E+00 | 0.0000000000E+00 |
| 2 | 5 | −3.2856198827E−15 | −1.6310096068E−14 |
| 1 | 6 | 0.0000000000E+00 | 0.0000000000E+00 |
| 0 | 7 | 1.3260418816E−15 | −2.0720237912E−14 |
| 8 | 0 | −5.0453926917E−19 | −7.7929360102E−19 |
| 7 | 1 | 0.0000000000E+00 | 0.0000000000E+00 |
| 6 | 2 | −2.9846686350E−19 | −9.2101487923E−18 |
| 5 | 3 | 0.0000000000E+00 | 0.0000000000E+00 |
| 4 | 4 | −9.9077348487E−18 | −1.7113751592E−17 |
| 3 | 5 | 0.0000000000E+00 | 0.0000000000E+00 |
| 2 | 6 | 7.4008313359E−18 | 1.1097925072E−16 |
| 1 | 7 | 0.0000000000E+00 | 0.0000000000E+00 |
| 0 | 8 | −1.0571408536E−17 | 3.2829567738E−16 |
| 9 | 0 | 0.0000000000E+00 | 0.0000000000E+00 |
| 8 | 1 | 1.8578972186E−21 | −8.0179553575E−21 |
| 7 | 2 | 0.0000000000E+00 | 0.0000000000E+00 |
| 6 | 3 | −9.0115283371E−21 | −6.2408375998E−20 |
| 5 | 4 | 0.0000000000E+00 | 0.0000000000E+00 |

TABLE 15-continued

Example 5

| | | First Mirror | Second Mirror |
|---|---|---|---|
| | | Paraxial Radius of Curvature | |
| C(i, j) | | −1506.040452 | −18925.54377 |
| 4 | 5 | 1.4671102605E−19 | 1.5608908872E−18 |
| 3 | 6 | 0.0000000000E+00 | 0.0000000000E+00 |
| 2 | 7 | 3.0900011627E−19 | 3.6020432086E−20 |
| 1 | 8 | 0.0000000000E+00 | 0.0000000000E+00 |
| 0 | 9 | 7.2616672045E−20 | 3.2600160640E−18 |
| 10 | 0 | 3.2480055515E−24 | 4.0578761402E−24 |
| 9 | 1 | 0.0000000000E+00 | 0.0000000000E+00 |
| 8 | 2 | 1.1897917299E−23 | 2.3242572384E−23 |
| 7 | 3 | 0.0000000000E+00 | 0.0000000000E+00 |
| 6 | 4 | −7.2386620437E−23 | 1.1828089006E−22 |
| 5 | 5 | 0.0000000000E+00 | 0.0000000000E+00 |
| 4 | 6 | 1.1646196014E−21 | 1.5266887976E−20 |
| 3 | 7 | 0.0000000000E+00 | 0.0000000000E+00 |
| 2 | 8 | −4.3370210477E−21 | −3.2020736768E−20 |
| 1 | 9 | 0.0000000000E+00 | 0.0000000000E+00 |
| 0 | 10 | −2.0322570293E−22 | −1.7794588744E−20 |

Figure 10:
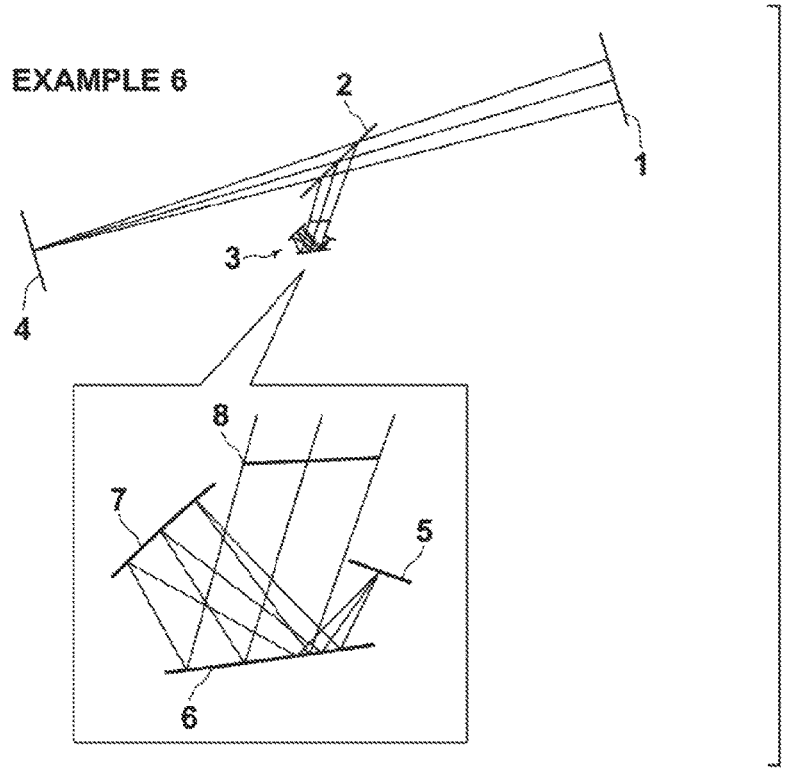
FIG. 10 is a schematic diagram that illustrates the configuration of a greater distance optical system of the head up display apparatus of Example 6.

Next, a head up display apparatus of Example 6 will be described. FIG. 10 is a schematic diagram that illustrates the configuration of the head up display apparatus of Example 6. In addition, data related to various items are shown in Table 16, arrangement coordinate data of each component element are shown in Table 17, and data related to the freely curved surface coefficients of each of the mirrors are shown in Table 18 for the head up display apparatus of Example 6.

TABLE 16

| Example 6 | |
|---|---|
| FOV [H × V] | 7° × 2° |
| Entrance Pupil Size [mm × mm] | 180 × 40 |
| Virtual Image Distance [mm] | 1900 |
| Image Display Region [mm × mm] | 60 × 17.14 |
| Angle of Image Display Region | 15.4° |

TABLE 17

Example 6

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0436 | 0.9990 | | | |
| First Mirror | 0.00 | −43.68 | 61.96 | 0.0000 | 0.4617 | 0.8870 | 360 | 210 | 26.5 |
| Second Mirror | 0.00 | −103.18 | 16.31 | 0.0000 | 0.8870 | 0.4617 | 350 | 128 | −11.5 |
| Aperture | 0.00 | −48.04 | −37.94 | 0.0000 | 0.3827 | 0.9239 | 330 | 130 | |
| Windshield | 0.00 | −56.76 | −237.75 | 0.0000 | 0.9026 | 0.4305 | | | |
| Pupil | 0.00 | 666.71 | −773.09 | 0.0000 | 0.8039 | −0.5948 | | | |
| Virtual Image | 0.00 | −860.62 | 357.07 | 0.0000 | 0.8039 | −0.5948 | | | |

TABLE 18

Example 6

| | | First Mirror | Second Mirror |
|---|---|---|---|
| | | Paraxial Radius of Curvature | |
| C(i, j) | | −1631.437754 | 566.5762094 |
| 1 | 0 | 0.0000000000E+00 | 0.0000000000E+00 |
| 0 | 1 | 0.0000000000E+00 | 0.0000000000E+00 |
| 2 | 0 | −5.2277226567E−05 | 0.0000000000E+00 |
| 1 | 1 | 0.0000000000E+00 | 0.0000000000E+00 |
| 0 | 2 | −2.2358712650E−05 | 0.0000000000E+00 |
| 3 | 0 | 0.0000000000E+00 | 0.0000000000E+00 |
| 2 | 1 | −2.7814114178E−07 | 0.0000000000E+00 |
| 1 | 2 | 0.0000000000E+00 | 0.0000000000E+00 |
| 0 | 3 | −1.0456075569E−06 | 0.0000000000E+00 |
| 4 | 0 | −8.3615469234E−10 | 0.0000000000E+00 |
| 3 | 1 | 0.0000000000E+00 | 0.0000000000E+00 |
| 2 | 2 | 9.5482636545E−09 | 0.0000000000E+00 |
| 1 | 3 | 0.0000000000E+00 | 0.0000000000E+00 |
| 0 | 4 | 2.7769329471E−08 | 0.0000000000E+00 |
| 5 | 0 | 0.0000000000E+00 | 0.0000000000E+00 |
| 4 | 1 | −1.1353584429E−11 | 0.0000000000E+00 |
| 3 | 2 | 0.0000000000E+00 | 0.0000000000E+00 |
| 2 | 3 | 2.1032113287E−10 | 0.0000000000E+00 |
| 1 | 4 | 0.0000000000E+00 | 0.0000000000E+00 |
| 0 | 5 | 9.9792017213E−11 | 0.0000000000E+00 |
| 6 | 0 | 1.5608451285E−13 | 0.0000000000E+00 |
| 5 | 1 | 0.0000000000E+00 | 0.0000000000E+00 |
| 4 | 2 | −2.1466099162E−13 | 0.0000000000E+00 |
| 3 | 3 | 0.0000000000E+00 | 0.0000000000E+00 |
| 2 | 4 | −7.9733160060E−12 | 0.0000000000E+00 |
| 1 | 5 | 0.0000000000E+00 | 0.0000000000E+00 |
| 0 | 6 | −2.3937963563E−13 | 0.0000000000E+00 |
| 7 | 0 | 0.0000000000E+00 | 0.0000000000E+00 |
| 6 | 1 | 1.5533963931E−15 | 0.0000000000E+00 |
| 5 | 2 | 0.0000000000E+00 | 0.0000000000E+00 |
| 3 | 4 | −3.0280450333E−14 | 0.0000000000E+00 |
| 4 | 3 | 0.0000000000E+00 | 0.0000000000E+00 |
| 2 | 5 | 2.6660050620E−15 | 0.0000000000E+00 |
| 1 | 6 | 0.0000000000E+00 | 0.0000000000E+00 |
| 0 | 7 | 4.2738475180E−14 | 0.0000000000E+00 |
| 8 | 0 | −6.6303504561E−18 | 0.0000000000E+00 |
| 7 | 1 | 0.0000000000E+00 | 0.0000000000E+00 |
| 6 | 2 | −3.6518779738E−17 | 0.0000000000E+00 |
| 5 | 3 | 0.0000000000E+00 | 0.0000000000E+00 |
| 4 | 4 | 1.1817909425E−15 | 0.0000000000E+00 |
| 3 | 5 | 0.0000000000E+00 | 0.0000000000E+00 |
| 2 | 6 | −4.8402526505E−16 | 0.0000000000E+00 |
| 1 | 7 | 0.0000000000E+00 | 0.0000000000E+00 |
| 0 | 8 | −3.4525802141E−15 | 0.0000000000E+00 |
| 9 | 0 | 0.0000000000E+00 | 0.0000000000E+00 |
| 8 | 1 | −6.6891689180E−20 | 0.0000000000E+00 |
| 7 | 2 | 0.0000000000E+00 | 0.0000000000E+00 |
| 6 | 3 | 5.1660611611E−19 | 0.0000000000E+00 |
| 5 | 4 | 0.0000000000E+00 | 0.0000000000E+00 |
| 4 | 5 | 1.0844931734E−17 | 0.0000000000E+00 |
| 3 | 6 | 0.0000000000E+00 | 0.0000000000E+00 |
| 2 | 7 | −7.4555354277E−17 | 0.0000000000E+00 |
| 1 | 8 | 0.0000000000E+00 | 0.0000000000E+00 |
| 0 | 9 | 5.7532305958E−17 | 0.0000000000E+00 |
| 10 | 0 | 1.1165673089E−22 | 0.0000000000E+00 |
| 9 | 1 | 0.0000000000E+00 | 0.0000000000E+00 |
| 8 | 2 | 2.6384378314E−21 | 0.0000000000E+00 |
| 7 | 3 | 0.0000000000E+00 | 0.0000000000E+00 |
| 6 | 4 | −3.5728338370E−20 | 0.0000000000E+00 |
| 5 | 5 | 0.0000000000E+00 | 0.0000000000E+00 |
| 4 | 6 | −1.5545442852E−19 | 0.0000000000E+00 |
| 3 | 7 | 0.0000000000E+00 | 0.0000000000E+00 |
| 2 | 8 | 1.1146760864E−18 | 0.0000000000E+00 |
| 1 | 9 | 0.0000000000E+00 | 0.0000000000E+00 |
| 0 | 10 | 1.1303998549E−21 | 0.0000000000E+00 |

Figure 11:
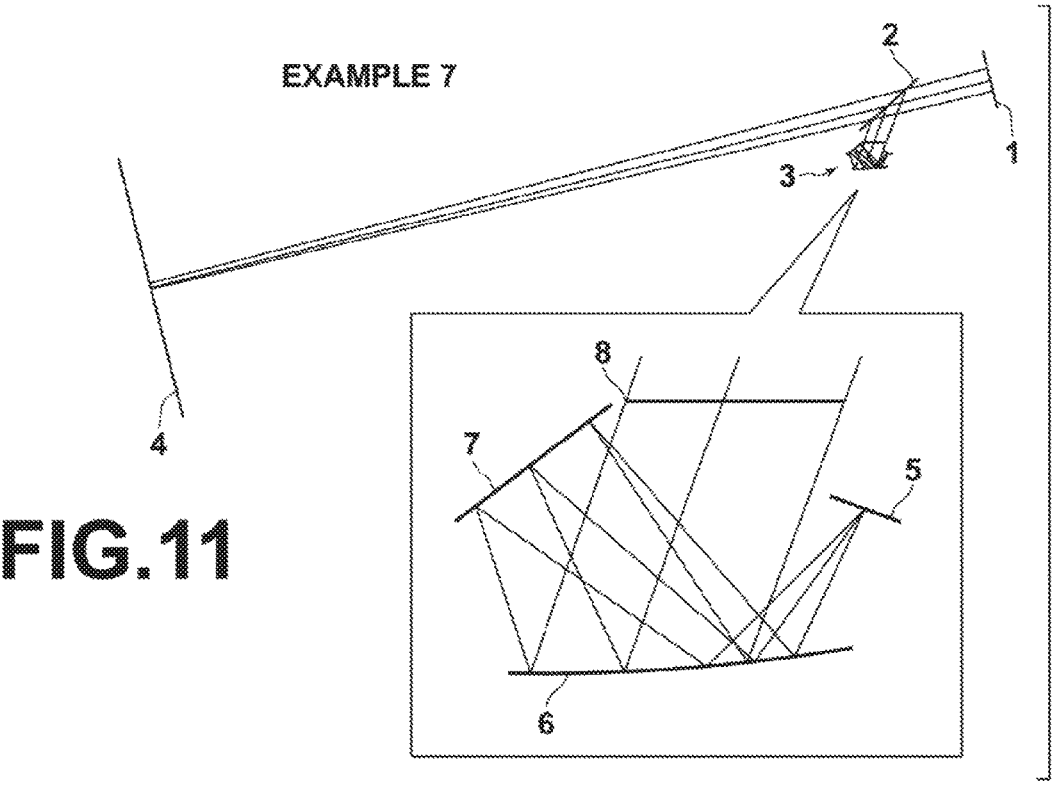
FIG. 11 is a schematic diagram that illustrates the configuration of a greater distance optical system of the head up display apparatus of Example 7.

Next, a head up display apparatus of Example 7 will be described. FIG. 11 is a schematic diagram that illustrates the configuration of the head up display apparatus of Example 7. In addition, data related to various items are shown in Table 19, arrangement coordinate data of each component element are shown in Table 20, and data related to the freely curved surface coefficients of each of the mirrors are shown in Table 21 for the head up display apparatus of Example 7.

TABLE 19

Example 7

| | |
|---|---|
| FOV [H × V] | 16° × 6° |
| Entrance Pupil Size [mm × mm] | 180 × 40 |
| Virtual Image Distance [mm] | 7500 |
| Image Display Region [mm × mm] | 176 × 66 |
| Angle of Image Display Region | 15.6° |

TABLE 20

Example 7

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −138.00 | 200.00 | 0.0000 | 0.4226 | 0.9063 | 600 | 300 | 38.5 |
| Second Mirror | 0.00 | −291.21 | 71.44 | 0.0000 | 0.8829 | 0.4695 | 570 | 170 | 13 |
| Aperture | 0.00 | −138.00 | −50.00 | 0.0000 | 0.3420 | 0.9397 | 520 | 190 | |
| Windshield | 0.00 | −138.00 | −400.00 | 0.0000 | 0.8829 | 0.4695 | | | |
| Pupil | 0.00 | 608.13 | −903.27 | 0.0000 | 0.8290 | −0.5592 | | | |
| Virtual Image | 0.00 | −5609.65 | 3290.67 | 0.0000 | 0.8290 | −0.5592 | | | |

TABLE 21

Example 7

| | | First Mirror | Second Mirror |
|---|---|---|---|
| | | Paraxial Radius of Curvature | |
| C(i, j) | | −1656.198003 | −41372.86609 |
| 1 | 0 | 0.0000000000E+00 | 0.0000000000E+00 |
| 0 | 1 | 3.7603012025E−02 | 8.8984536218E−02 |
| 2 | 0 | 1.2600378763E−05 | 1.6121975879E−04 |
| 1 | 1 | 0.0000000000E+00 | 0.0000000000E+00 |
| 0 | 2 | −1.5430351642E−05 | −7.4777949354E−06 |
| 3 | 0 | 0.0000000000E+00 | 0.0000000000E+00 |
| 2 | 1 | −4.6549358400E−08 | −1.8420583120E−08 |
| 1 | 2 | 0.0000000000E+00 | 0.0000000000E+00 |
| 0 | 3 | 3.1690856758E−08 | 1.2189348251E−07 |
| 4 | 0 | 2.5282021299E−10 | 5.6111315740E−10 |
| 3 | 1 | 0.0000000000E+00 | 0.0000000000E+00 |
| 2 | 2 | −5.4701640558E−10 | −1.6038157167E−09 |
| 1 | 3 | 0.0000000000E+00 | 0.0000000000E+00 |
| 0 | 4 | −1.4039173517E−10 | −8.2483647461E−10 |
| 5 | 0 | 0.0000000000E+00 | 0.0000000000E+00 |
| 4 | 1 | 1.5385395084E−13 | 1.9460353225E−13 |
| 3 | 2 | 0.0000000000E+00 | 0.0000000000E+00 |
| 2 | 3 | −2.5362681311E−12 | −7.6881577206E−12 |
| 1 | 4 | 0.0000000000E+00 | 0.0000000000E+00 |
| 0 | 5 | 7.3302057348E−13 | −1.2370414694E−12 |
| 6 | 0 | 1.4070202028E−15 | 2.3920337156E−15 |
| 5 | 1 | 0.0000000000E+00 | 0.0000000000E+00 |
| 4 | 2 | −3.2204931740E−16 | −1.3141955386E−15 |
| 3 | 3 | 0.0000000000E+00 | 0.0000000000E+00 |
| 2 | 4 | −2.8206942367E−14 | −1.8725167711E−13 |
| 1 | 5 | 0.0000000000E+00 | 0.0000000000E+00 |
| 0 | 6 | 1.6064744543E−15 | −1.5242679502E−14 |
| 7 | 0 | 0.0000000000E+00 | 0.0000000000E+00 |
| 6 | 1 | −5.4795530209E−18 | 2.9258123243E−18 |
| 5 | 2 | 0.0000000000E+00 | 0.0000000000E+00 |
| 3 | 4 | −1.5417626299E−17 | −2.9936652792E−17 |
| 4 | 3 | 0.0000000000E+00 | 0.0000000000E+00 |
| 2 | 5 | 1.3127208840E−16 | 6.8480414807E−16 |
| 1 | 6 | 0.0000000000E+00 | 0.0000000000E+00 |
| 0 | 7 | −2.9372804258E−17 | −1.5914805239E−16 |
| 8 | 0 | 4.4629466693E−21 | 8.7851511820E−21 |
| 7 | 1 | 0.0000000000E+00 | 0.0000000000E+00 |
| 6 | 2 | 4.9774553294E−20 | 5.5322757329E−20 |
| 5 | 3 | 0.0000000000E+00 | 0.0000000000E+00 |
| 4 | 4 | 2.5574616500E−19 | 2.8290168397E−18 |
| 3 | 5 | 0.0000000000E+00 | 0.0000000000E+00 |
| 2 | 6 | 3.0144408353E−19 | 2.9790085427E−18 |
| 1 | 7 | 0.0000000000E+00 | 0.0000000000E+00 |
| 0 | 8 | 2.7292137113E−19 | 1.8827425752E−17 |
| 9 | 0 | 0.0000000000E+00 | 0.0000000000E+00 |
| 8 | 1 | −6.8311619534E−23 | −1.0056543411E−22 |
| 7 | 2 | 0.0000000000E+00 | 0.0000000000E+00 |
| 6 | 3 | 1.4973176244E−22 | 3.8242406430E−22 |
| 5 | 4 | 0.0000000000E+00 | 0.0000000000E+00 |

TABLE 21-continued

Example 7

| | | First Mirror | Second Mirror |
|---|---|---|---|
| | | Paraxial Radius of Curvature | |
| C(i, j) | | −1656.198003 | −41372.86609 |
| 4 | 5 | −8.2338595982E−22 | −1.3745775970E−20 |
| 3 | 6 | 0.0000000000E+00 | 0.0000000000E+00 |
| 2 | 7 | −1.1903619982E−20 | −1.4257624438E−19 |
| 1 | 8 | 0.0000000000E+00 | 0.0000000000E+00 |
| 0 | 9 | −4.4940663039E−22 | 3.1554061450E−20 |
| 10 | 0 | 7.3549242174E−26 | −1.9942501342E−26 |
| 9 | 1 | 0.0000000000E+00 | 0.0000000000E+00 |
| 8 | 2 | −5.7320281219E−25 | −2.9253489448E−25 |
| 7 | 3 | 0.0000000000E+00 | 0.0000000000E+00 |
| 6 | 4 | −2.7521246580E−24 | −3.0766298982E−23 |
| 5 | 5 | 0.0000000000E+00 | 0.0000000000E+00 |
| 4 | 6 | 2.5547573874E−23 | 1.6883251711E−22 |
| 3 | 7 | 0.0000000000E+00 | 0.0000000000E+00 |
| 2 | 8 | −9.3622579772E−24 | 3.1047666343E−22 |
| 1 | 9 | 0.0000000000E+00 | 0.0000000000E+00 |
| 0 | 10 | 3.8800274793E−24 | −1.4420694948E−21 |

Figure 12:
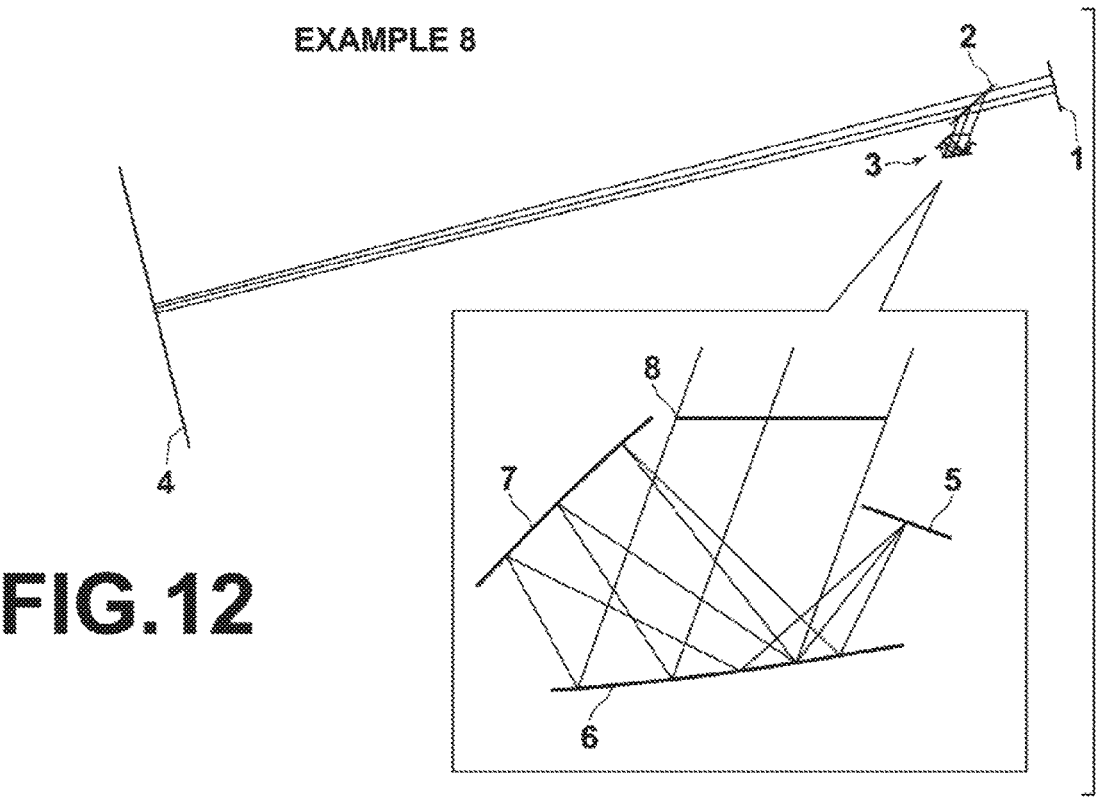
FIG. 12 is a schematic diagram that illustrates the configuration of a greater distance optical system of the head up display apparatus of Example 8.

Next, a head up display apparatus of Example 8 will be described. FIG. 12 is a schematic diagram that illustrates the configuration of the head up display apparatus of Example 8. In addition, data related to various items are shown in Table 22, arrangement coordinate data of each component element are shown in Table 23, and data related to the freely curved surface coefficients of each of the mirrors are shown in Table 24 for the head up display apparatus of Example 8.

TABLE 22

| Example 8 | |
|---|---|
| FOV [H × V] | 16° × 6° |
| Entrance Pupil Size [mm × mm] | 180 × 40 |
| Virtual Image Distance [mm] | 10000 |
| Image Display Region [mm × mm] | 160 × 60 |
| Angle of Image Display Region | 17.9° |

TABLE 23

Example 8

| | Origin Coordinates | | | Vector of Line Normal to Reference Surface | | | Aperture Data | | |
|---|---|---|---|---|---|---|---|---|---|
| | x | y | z | i | j | k | Aperture Width X | Aperture Width Y | Aperture Y Shift |
| Absolute Coordinate Origin | 0.00 | 0.00 | 0.00 | 0.0000 | 0.0000 | 1.0000 | | | |
| Image Display Section | 0.00 | 0.00 | 0.00 | 0.0000 | 0.0000 | 1.0000 | | | |
| First Mirror | 0.00 | −138.00 | 200.00 | 0.0000 | 0.4226 | 0.9063 | 600 | 320 | 37.5 |
| Second Mirror | 0.00 | −291.21 | 71.44 | 0.0000 | 0.8829 | 0.4695 | 620 | 220 | −16.5 |
| Aperture | 0.00 | −138.00 | −50.00 | 0.0000 | 0.3420 | 0.9397 | 520 | 190 | |
| Windshield | 0.00 | −138.00 | −400.00 | 0.0000 | 0.8829 | 0.4695 | | | |
| Pupil | 0.00 | 608.13 | −903.27 | 0.0000 | 0.8290 | −0.5592 | | | |
| Virtual Image | 0.00 | −7682.24 | 4688.66 | 0.0000 | 0.8290 | −0.5592 | | | |

TABLE 24

Example 8

| | | First Mirror | Second Mirror |
|---|---|---|---|
| | | Paraxial Radius of Curvature | |
| C(i, j) | | −7259.4691 | 1620.5176 |
| 1 | 0 | 0.0000000000E+00 | 0.0000000000E+00 |
| 0 | 1 | −3.0768731962E−02 | −3.1382767230E−02 |
| 2 | 0 | −1.3368845568E−04 | 1.2218046479E−05 |
| 1 | 1 | 0.0000000000E+00 | 0.0000000000E+00 |
| 0 | 2 | −1.2652243994E−04 | −3.0488656596E−05 |
| 3 | 0 | 0.0000000000E+00 | 0.0000000000E+00 |
| 2 | 1 | −1.9657691839E−07 | −2.7743407289E−07 |
| 1 | 2 | 0.0000000000E+00 | 0.0000000000E+00 |
| 0 | 3 | −2.6292943154E−08 | −2.5996468671E−08 |
| 4 | 0 | 1.3675774331E−10 | 2.1149595659E−10 |
| 3 | 1 | 0.0000000000E+00 | 0.0000000000E+00 |
| 2 | 2 | −1.5643716042E−11 | −1.0804549175E−09 |
| 1 | 3 | 0.0000000000E+00 | 0.0000000000E+00 |
| 0 | 4 | −4.1542162403E−10 | −4.5129521655E−09 |
| 5 | 0 | 0.0000000000E+00 | 0.0000000000E+00 |
| 4 | 1 | −2.2384777163E−13 | −3.8016676755E−13 |
| 3 | 2 | 0.0000000000E+00 | 0.0000000000E+00 |
| 2 | 3 | −1.3803848289E−12 | −1.9318961104E−11 |
| 1 | 4 | 0.0000000000E+00 | 0.0000000000E+00 |
| 0 | 5 | 2.7575127042E−12 | 7.0973994312E−11 |
| 6 | 0 | 1.1832191713E−15 | 1.3010341388E−15 |
| 5 | 1 | 0.0000000000E+00 | 0.0000000000E+00 |
| 4 | 2 | −2.7265877271E−15 | −1.0901206429E−14 |
| 3 | 3 | 0.0000000000E+00 | 0.0000000000E+00 |
| 2 | 4 | −8.5887271194E−14 | −2.7348069268E−13 |
| 1 | 5 | 0.0000000000E+00 | 0.0000000000E+00 |
| 0 | 6 | 9.5466425321E−15 | 1.0801947266E−12 |
| 7 | 0 | 0.0000000000E+00 | 0.0000000000E+00 |
| 6 | 1 | −9.3873289721E−18 | −7.7081259762E−18 |
| 5 | 2 | 0.0000000000E+00 | 0.0000000000E+00 |
| 3 | 4 | −3.1748443967E−18 | −4.7059031176E−17 |
| 4 | 3 | 0.0000000000E+00 | 0.0000000000E+00 |
| 2 | 5 | −3.0190231409E−16 | 7.9778110984E−16 |
| 1 | 6 | 0.0000000000E+00 | 0.0000000000E+00 |
| 0 | 7 | 4.1429831560E−16 | −8.5540848925E−15 |
| 8 | 0 | 1.4803290568E−21 | 2.1187548525E−21 |
| 7 | 1 | 0.0000000000E+00 | 0.0000000000E+00 |
| 6 | 2 | 1.3719845764E−20 | −2.3514953209E−20 |
| 5 | 3 | 0.0000000000E+00 | 0.0000000000E+00 |
| 4 | 4 | 2.1502822695E−19 | 1.4071176292E−18 |
| 3 | 5 | 0.0000000000E+00 | 0.0000000000E+00 |
| 2 | 6 | 6.4910152900E−18 | 1.7061408659E−17 |
| 1 | 7 | 0.0000000000E+00 | 0.0000000000E+00 |
| 0 | 8 | −1.8710865001E−18 | −1.1539708751E−16 |
| 9 | 0 | 0.0000000000E+00 | 0.0000000000E+00 |
| 8 | 1 | −3.2227323808E−23 | −5.3933083633E−23 |
| 7 | 2 | 0.0000000000E+00 | 0.0000000000E+00 |
| 6 | 3 | −9.8760622723E−22 | −1.7881408144E−21 |
| 5 | 4 | 0.0000000000E+00 | 0.0000000000E+00 |

TABLE 24-continued

Example 8

| | | First Mirror | Second Mirror |
|---|---|---|---|
| | | Paraxial Radius of Curvature | |
| C(i, j) | | −7259.4691 | 1620.5176 |
| 4 | 5 | 3.8571725487E−21 | 1.2031304558E−20 |
| 3 | 6 | 0.0000000000E+00 | 0.0000000000E+00 |
| 2 | 7 | −4.5307599885E−21 | −1.1198707414E−19 |
| 1 | 8 | 0.0000000000E+00 | 0.0000000000E+00 |
| 0 | 9 | −1.1026315833E−20 | 4.6354704506E−19 |
| 10 | 0 | 3.8545813792E−26 | −5.4154359231E−27 |
| 9 | 1 | 0.0000000000E+00 | 0.0000000000E+00 |
| 8 | 2 | −1.6562361116E−25 | −7.4397155270E−25 |
| 7 | 3 | 0.0000000000E+00 | 0.0000000000E+00 |
| 6 | 4 | 3.9330794024E−24 | −5.8380829008E−25 |
| 5 | 5 | 0.0000000000E+00 | 0.0000000000E+00 |
| 4 | 6 | −4.9903686228E−24 | −1.0280551506E−23 |
| 3 | 7 | 0.0000000000E+00 | 0.0000000000E+00 |
| 2 | 8 | −1.5260081970E−22 | −8.0243685235E−22 |
| 1 | 9 | 0.0000000000E+00 | 0.0000000000E+00 |
| 0 | 10 | 6.2431117767E−23 | 4.8842899546E−21 |

Values corresponding to Conditional Formulae (1) through (3) for Examples 1 through 8 are shown in Table 25.

TABLE 25

| Formula | Condition | Example 1 | Example 2 | Example 3 | Example 4 |
|---|---|---|---|---|---|
| (1) | Sm/Si | 24.79 | 23.08 | 24.09 | 9.20 |
| (2) | α | 29.14 | 29.95 | 33.23 | 33.08 |
| (3) | L2/L1 | 1.13 | 1.15 | 1.18 | 1.28 |

| Formula | Condition | Example 5 | Example 6 | Example 7 | Example 8 |
|---|---|---|---|---|---|
| (1) | Sm/Si | 16.45 | 14.22 | 8.40 | 14.36 |
| (2) | α | 35.49 | 35.35 | 33.27 | 36.07 |
| (3) | L2/L1 | 1.30 | 1.23 | 1.30 | 1.29 |

From the data above, it can be understood that the head up display apparatuses of Examples 1 through 8 all satisfy Conditional Formulae (1) through (3) and are head up display apparatuses which are capable of securing optical path lengths from image display elements to image reflection surfaces, achieving miniaturization, and displaying virtual images having high image quality.

The present disclosure has been described above with reference to the embodiment and the Examples. However, the present disclosure is not limited to the embodiments and Examples, and various modifications are possible. For example, the positions and sizes of the component elements that constitute the head up display apparatus are not limited to those shown by the values in the Examples of numerical values, but may be other values.

In addition, the embodiment above has been described as an aspect in which an image which is displayed by the image display element is directly displayed as a virtual image. Alternatively, an image which is displayed by the image display element may be projected through a diffusing member such as a diffuser in order to enlarge the range of pupil positions (eye box) of an observer in which a virtual image can be appropriately observed. In this case, the image display surface of the diffusing member may be provided at a position that overlaps with the image display surface of the image display element within the above embodiment.

What is claimed is:

1. A head up display apparatus that magnifies and displays an image to an observer as a virtual image, comprising:
    an image reflection surface that faces the observer and reflects display light which is displayed on an image display surface toward the observer;
    a first mirror having power;
    a second mirror having power; and
    a light shielding member provided with an aperture;
    the aperture being provided between the image display surface and the second mirror;
    the display light which is output from the image display surface being reflected by the first mirror, the second mirror, and the first mirror in this order, and reaching the image reflection surface by passing through the aperture.

2. A head up display apparatus as defined in claim 1, wherein:
    a light deflecting means is not included within the optical path of the display light from the image display surface to the first mirror; and
    the image display surface is provided at a position at which external light that enters through the aperture does not directly impinge thereon.

3. A head up display apparatus as defined in claim 1, wherein:
    at least a portion of the aperture is above the upper edge of a reflection surface of the second mirror, when the direction of the optical path of the display light from the image display surface to the first mirror is vertical, the side of the first mirror is the downward direction, and the side of the image reflection surface is the upward direction.

4. A head up display apparatus as defined in claim 1, in which Conditional Formula (1) below is satisfied:

$$5 < Sm/Si < 30 \qquad (1)$$

wherein Si is the area of the image display surface capable of displaying an image, and Sm is the surface area of the reflection surface of the second mirror.

5. A head up display as defined in claim 4, in which Conditional Formula (1-1) below is satisfied:

$$7 < Sm/Si < 27 \qquad (1\text{-}1).$$

6. A head up display apparatus as defined in claim 1, in which Conditional Formula (2) below is satisfied:

$$20 < \alpha < 45 \qquad (2)$$

wherein $\alpha$ is the incident angle of a light ray having the minimal incident angle with respect to a line normal to the reflection surface of the first mirror at a position at which a light beam output from the center of a region of the image display surface which is capable of displaying images, within the light beam.

7. A head up display as defined in claim 6, in which Conditional Formula (2-1) below is satisfied:

$$25 < \alpha < 40 \qquad (2\text{-}1).$$

8. A head up display apparatus as defined in claim 1, in which Conditional Formula (3) below is satisfied:

$$1.05 < L2/L1 < 1.35 \qquad (3)$$

wherein L1 is the minimum value of the optical length from the image display surface to the first mirror within a light beam which is output from the center of an edge opposite an edge toward the second mirror of the region of the image display surface which is capable of displaying images, and L2 is the minimum value of the optical length from the image display surface to the first mirror within a light beam which is output from the center of the edge toward the second mirror of the region of the image display surface which is capable of displaying images.

9. A head up display as defined in claim 8, in which Conditional Formula (3-1) below is satisfied:

$$1.10 < L2/L1 < 1.31 \qquad (3\text{-}1).$$

* * * * *